United States Patent
Fujisawa et al.

(10) Patent No.: US 10,647,331 B2
(45) Date of Patent: May 12, 2020

(54) PRESENTATION CONTROL DEVICE AND PRESENTATION CONTROL METHOD

(71) Applicant: DENSO CORPORATION, Kariya, Aichi-pref. (JP)

(72) Inventors: Yuki Fujisawa, Kariya (JP); Akira Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/774,189

(22) PCT Filed: Sep. 7, 2016

(86) PCT No.: PCT/JP2016/076242
§ 371 (c)(1),
(2) Date: May 7, 2018

(87) PCT Pub. No.: WO2017/081919
PCT Pub. Date: May 18, 2017

(65) Prior Publication Data
US 2018/0326996 A1    Nov. 15, 2018

(30) Foreign Application Priority Data
Nov. 9, 2015  (JP) .............................. 2015-219722

(51) Int. Cl.
*B60W 50/14* (2020.01)
*B60W 50/16* (2020.01)
(Continued)

(52) U.S. Cl.
CPC ........... *B60W 50/085* (2013.01); *B60K 35/00* (2013.01); *B60W 50/14* (2013.01); *B60W 50/16* (2013.01);
(Continued)

(58) Field of Classification Search
CPC .... B60W 50/085; B60W 50/14; B60W 50/16; B60W 30/18163; B60K 2370/193
See application file for complete search history.

(56) References Cited

U.S. PATENT DOCUMENTS

2005/0134440 A1* 6/2005 Breed .................. B60N 2/2863
                                                              340/435
2006/0100774 A1   5/2006 Barkowski et al.
(Continued)

FOREIGN PATENT DOCUMENTS

JP    2006-500593 A    1/2006
JP    2009-061878 A    3/2009
(Continued)

*Primary Examiner* — Abby Y Lin
*Assistant Examiner* — Renee LaRose
(74) *Attorney, Agent, or Firm* — Knobbe, Martens, Olson & Bear, LLP

(57) ABSTRACT

A presentation control device controlling an information presentation device in a vehicle equipped with a vehicle control device for controlling an acceleration-deceleration function or a steering function, includes: a plan acquisition section that acquires a travel plan indicating a control content of the vehicle; a behavior change determination section that determines whether a control target value relating to a magnitude of a behavior change included in the travel plan is larger than an advance threshold; and a presentation execution section that presents the control content to the occupant using the information presentation device in accordance with the behavior change occurring in the vehicle when the control target value is smaller than the advance threshold, and presents the control content temporarily in advance of an actual behavior change when the control target value is larger than the advance threshold.

18 Claims, 15 Drawing Sheets

(51) Int. Cl.
  *B60W 50/08*   (2020.01)
  *B60K 35/00*   (2006.01)
  *G08G 1/16*        (2006.01)
  *B60W 30/18*       (2012.01)
  *G05D 1/02*        (2020.01)

(52) U.S. Cl.
  CPC .. *B60K 2370/152* (2019.05); *B60K 2370/175* (2019.05); *B60K 2370/193* (2019.05); *B60W 30/18163* (2013.01); *B60W 2050/146* (2013.01); *G05D 1/021* (2013.01); *G05D 2201/0213* (2013.01); *G08G 1/167* (2013.01)

(56) References Cited

U.S. PATENT DOCUMENTS

| | | |
|---|---|---|
| 2010/0211235 A1 | 8/2010 | Taguchi et al. |
| 2012/0062375 A1 | 3/2012 | Takeuchi et al. |
| 2012/0260752 A1 | 10/2012 | Yang et al. |
| 2014/0067250 A1 | 3/2014 | Bone et al. |

FOREIGN PATENT DOCUMENTS

| | | |
|---|---|---|
| JP | 2012-061944 A | 3/2012 |
| JP | 2013-516066 A | 5/2013 |
| WO | 2012/160590 A | 11/2012 |

* cited by examiner

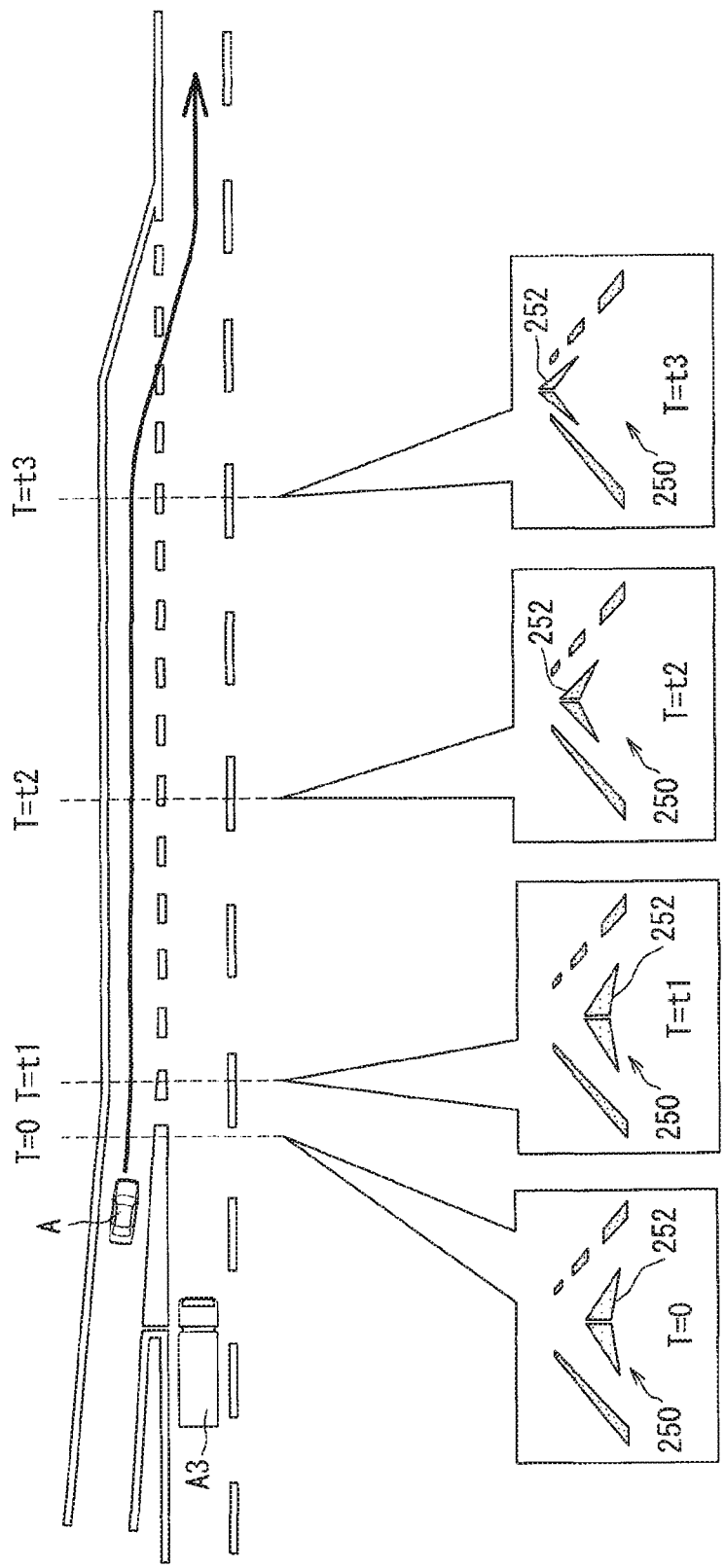

PRESENTATION CONTROL DEVICE AND PRESENTATION CONTROL METHOD

CROSS REFERENCE TO RELATED APPLICATION

This application is based on Japanese Patent Application No. 2015-219722 filed on Nov. 9, 2015, the disclosure of which is incorporated herein by reference.

TECHNICAL FIELD

The present disclosure relates to a presentation control device that is mounted on a vehicle and controls an information presentation device that presents information to an occupant of the vehicle and a presentation control method.

BACKGROUND ART

As a conventional technique, for example, Patent Literature 1 discloses a system that collectively presents pieces of information required for a lane change to a driver who is driving a vehicle to support the driving of the driver. Specifically, in the system disclosed in Patent Literature 1, information such as the direction of the lane change, the permissibility of the lane change, a waiting time for the lane change, an acceleration or deceleration required for the lane change, and the position of another vehicle is presented to the driver with an arrow-like display.

In recent years, mounting of a vehicle control device that controls at least either acceleration/deceleration or steering on behalf of a driver on a vehicle has been pushed forward. In such a vehicle whose behavior is controlled by the vehicle control device, the vehicle control device implements a lane change. Thus, it is considered that information presentation that supports a lane change of a driver as disclosed in Patent Literature 1 is unnecessary.

On the other hand, in a state where the behavior of a vehicle is controlled by the vehicle control device, it is difficult for an occupant of the vehicle to grasp the details of the control by the vehicle control device. Thus, the inventors of the present disclosure have conceived presenting the details of acceleration/deceleration control or steering control performed by the vehicle control device to an occupant in accordance with a behavior change occurring in the vehicle. According to such presentation of operating information of the vehicle control device, an occupant of the vehicle can feel safe with the control of the vehicle by the vehicle control device.

However, when the details of the control are presented in accordance with a behavior change of the vehicle, an occupant of the vehicle cannot recognize in advance the occurrence of a scheduled large behavior change. Thus, the occupant is likely to be anxious when the large behavior change actually occurs.

In addition, the vehicle control device attempts to control the behavior of the vehicle as gently as possible. Thus, when a large behavior change such as a lane change occurs, a change per unit time becomes small in the information presentation according to the behavior change of the vehicle. Thus, an occupant of the vehicle cannot image the magnitude of a behavior change that is scheduled to occur in the vehicle from the information presentation and may feel anxious.

PRIOR ART LITERATURES

Patent Literature

Patent Literature 1: WO-2012-160590-A

SUMMARY

It is an object of the present disclosure to provide a presentation control device and a presentation control method that make it possible to reduce the anxiety of an occupant of a vehicle whose behavior is controlled by a vehicle control device.

According to a first aspect of the present disclosure, a presentation control device that controls an information presentation device to present information to an occupant of a vehicle equipped with a vehicle control device for controlling at least one of an acceleration and deceleration function and a steering function, the presentation control device includes: a plan acquisition section that acquires a travel plan indicating a content of control of the vehicle scheduled in the vehicle control device; a behavior change determination section that determines whether a control target value relating to a magnitude of a behavior change included in the travel plan is larger than an advance threshold corresponding to the control target value; and a presentation execution section that presents the content of control performed by the vehicle control device to the occupant using the information presentation device in accordance with the behavior change occurring in the vehicle when the control target value is smaller than the advance threshold, and presents the content of control to be performed by the vehicle control device based on the travel plan temporarily in advance of an actual behavior change when the control target value is larger than the advance threshold.

According to the above presentation control device, when the control target value relating to the magnitude of acceleration/deceleration or steering is larger than the advance threshold, and a large behavior change occurs in the vehicle, the presentation of the content of control by the vehicle control device to the occupant is performed temporarily in advance of the actual behavior change of the vehicle. As a result, the occupant of the vehicle can recognize in advance the occurrence of the large behavior change by the information presentation through the information presentation device.

In addition, the information presentation exhibits a large change with a short time by the process of temporarily advancing the presentation of a behavior change. Thus, it is possible to notify the occupant of the content of control by the vehicle control device in an exaggerated manner. Thus, the occupant can easily image the magnitude of the behavior change that is scheduled to occur in the vehicle from the information presentation.

According to the above, the occupant who has information presented by the information presentation device can accurately predict in advance a large behavior change that is going to occur in the vehicle. Thus, the presentation control device can reduce the anxiety of the occupant of the vehicle whose behavior is controlled by the vehicle control device.

According to a second aspect of the present disclosure, a presentation control method for controlling an information presentation device to present information to an occupant of a vehicle equipped with a vehicle control device of controlling at least one of an acceleration and deceleration function and a steering function, the presentation control method includes: acquiring a travel plan indicating a content of control of the vehicle scheduled in the vehicle control device; determining whether a control target value relating to a magnitude of a behavior change included in the travel plan is larger than an advance threshold corresponding to the control target value; presenting the content of control performed by the vehicle control device to the occupant using the information presentation device in accordance with the behavior change occurring in the vehicle when the control target value is smaller than the advance threshold; and presenting the content of control to be performed by the vehicle control device based on the travel plan temporarily in advance of an actual behavior change when the control target value is larger than the advance threshold.

According to the above presentation control method, when the control target value relating to the magnitude of acceleration/deceleration or steering is larger than the advance threshold, and a large behavior change occurs in the vehicle, the presentation of the content of control by the vehicle control device to the occupant is performed temporarily in advance of the actual behavior change of the vehicle. As a result, the occupant of the vehicle can recognize in advance the occurrence of the large behavior change by the information presentation through the information presentation device.

In addition, the information presentation exhibits a large change with a short time by the process of temporarily advancing the presentation of a behavior change. Thus, it is possible to notify the occupant of the content of control by the vehicle control device in an exaggerated manner. Thus, the occupant can easily image the magnitude of the behavior change that is scheduled to occur in the vehicle from the information presentation.

According to the above, the occupant who has information presented by the information presentation device can accurately predict in advance a large behavior change that is going to occur in the vehicle. Thus, the presentation control device can reduce the anxiety of the occupant of the vehicle whose behavior is controlled by the vehicle control device.

BRIEF DESCRIPTION OF DRAWINGS

The above and other objects, features and advantages of the present disclosure will become more apparent from the following detailed description made with reference to the accompanying drawings. In the drawings:

FIG. 16 is a diagram illustrating another example of the scene in which no advance presentation is performed.

EMBODIMENTS

Hereinbelow, a plurality of embodiments will be described with reference to the drawings. Corresponding elements between the respective embodiments may be denoted by the same reference signs to avoid repetitive description. In each of the embodiments, when only a part of a configuration is described, a configuration of the other preceding embodiments can be applied to the other part of the configuration. Further, in addition to a combination of configurations clearly stated in each of the embodiments, configurations of a plurality of embodiments may be partially combined even if not clearly stated unless there is an obstacle in the combination. Further, a combination of configurations described in a plurality of embodiments and modifications which is not clearly stated is also disclosed by the following description.

First Embodiment

Figure 1:
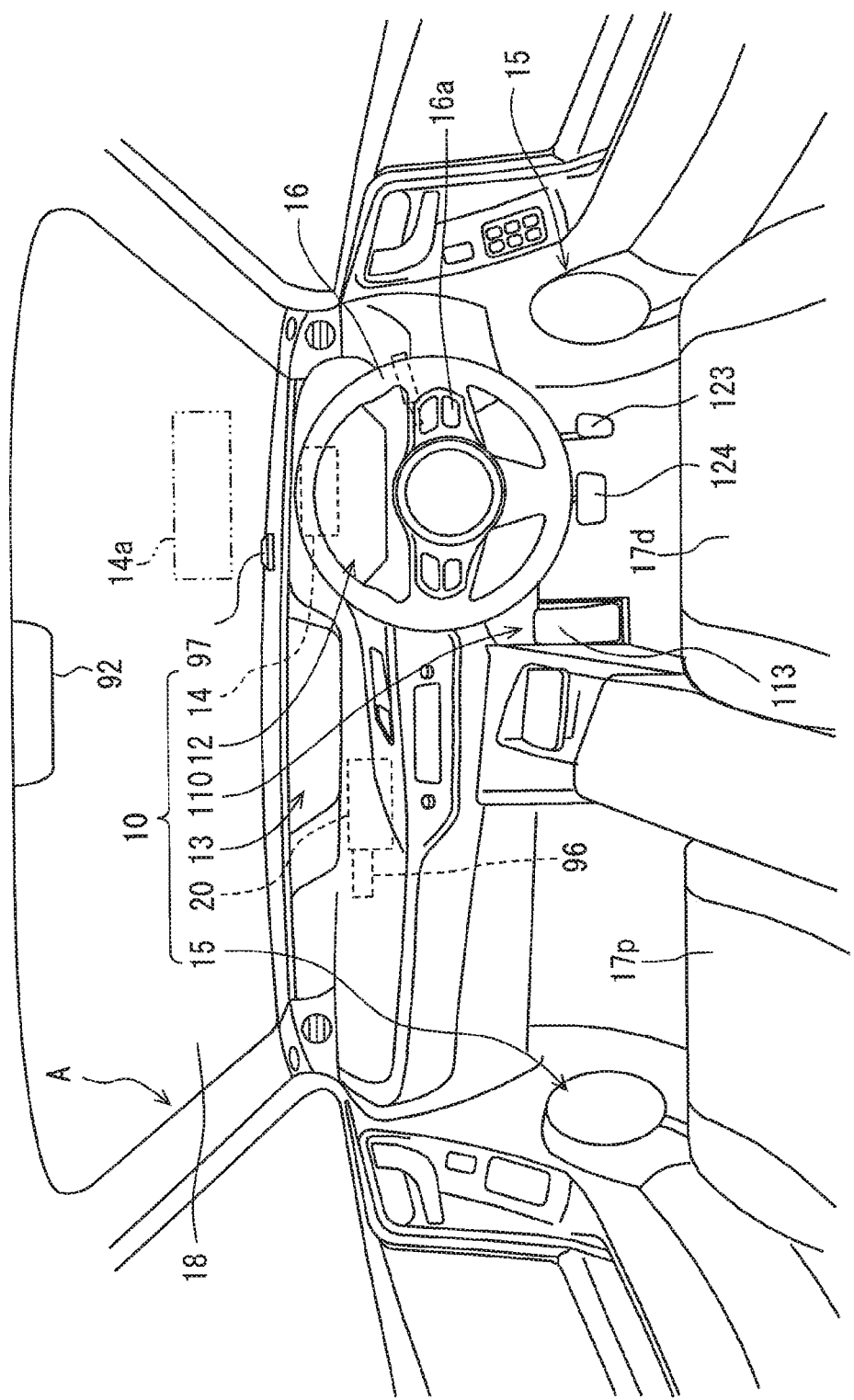
FIG. 1 is a diagram illustrating the layout of a driver's seat and the surroundings thereof in an own vehicle.
Figure 2:
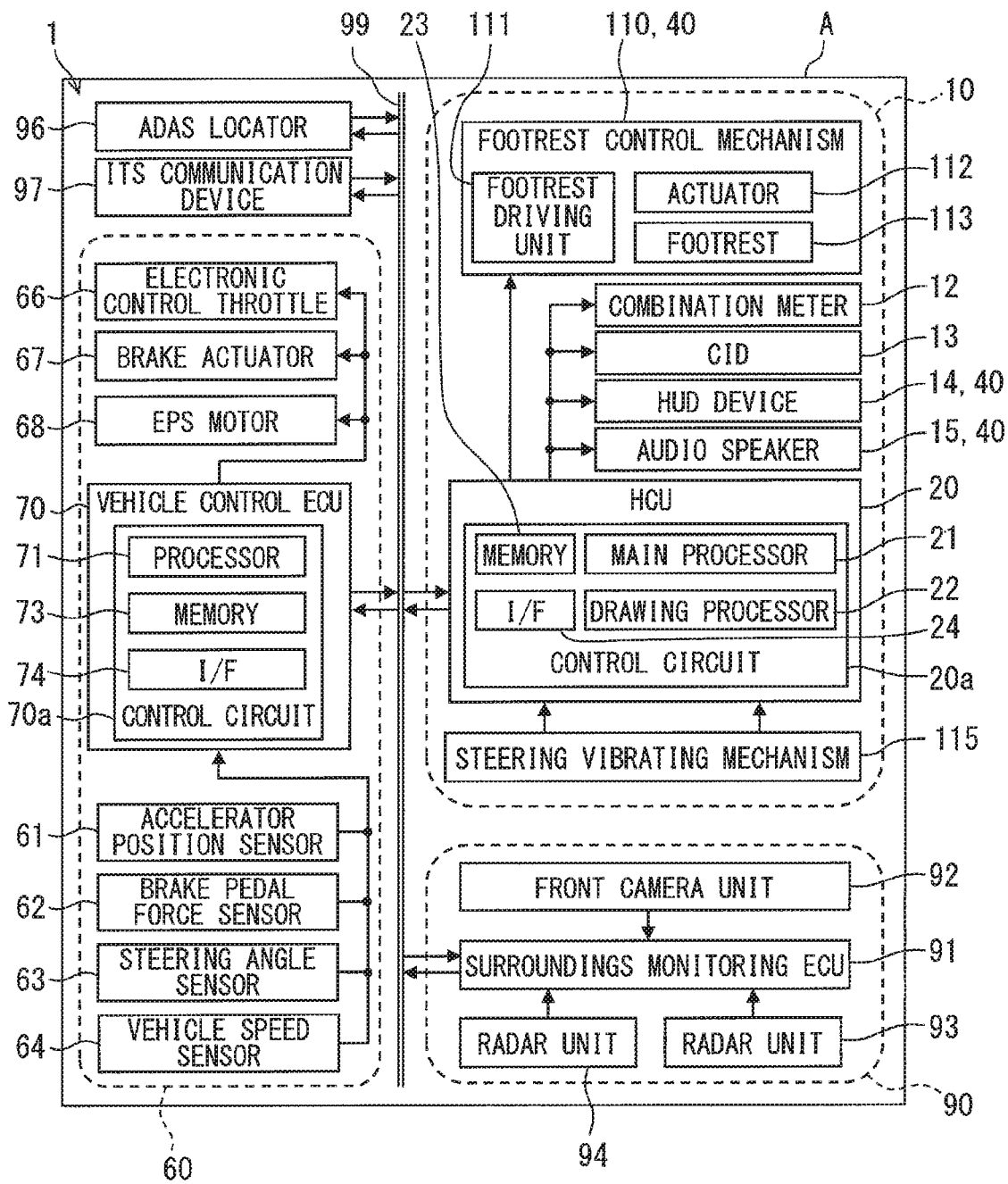
FIG. 2 is a block diagram illustrating the entire configuration of an in-vehicle network.

A human machine interface (HMI) control unit (HCU) 20 of a first embodiment is an electronic device mounted on an own vehicle A as illustrated in FIGS. 1 and 2. The HCU 20 is one of a plurality of nodes provided in an in-vehicle network 1 which is mounted on the own vehicle A. The in-vehicle network 1 includes an ADAS locator 96, an ITS communication device 97, an external recognition system 90, a vehicle control system 60, and an HMI system 10. These configurations are connected to a communication bus 99 and capable of exchanging information therebetween by communication.

The advanced driver assistance systems (ADAS) locator 96 is provided with a GNSS receiver, an inertial sensor such as a gyroscopic sensor, and a memory which stores map data. The global navigation satellite system (GNSS) receiver receives positioning signals from a plurality of artificial satellites. The ADAS locator 96 measures the position of the own vehicle A by combining positioning signals received by the GNSS receiver with a result of measurement by the inertial sensor. The ADAS locator 96 reads map data of an area ahead of the own vehicle A from the memory and extracts road information such as the radius of curvature, a turning angle, and a starting position of a curve. The ADAS locator 96 outputs the positional information of the own vehicle A and the road information ahead to the communication bus 99.

The intelligent transport systems (ITS) communication device 97 is capable of exchanging information with an in-vehicle communication device which is mounted on another vehicle around the own vehicle and a roadside device which is installed on the road side by wireless communication. The ITS communication device 97 acquires positional information and traveling speed information of another vehicle traveling around the own vehicle by vehicle-to-vehicle communication with the in-vehicle communication device and road-to-vehicle communication with the roadside device. The ITS communication device 97 outputs the acquired information to the communication bus 99.

The external recognition system 90 is provided with a front camera unit 92, external sensors including radar units 93, 94, and a surroundings monitoring ECU 91. The external recognition system 90 detects moving objects such as a pedestrian, an animal other than a human, a bicycle, a motorcycle, and another vehicle and also stationary objects such as a fallen object on a road, a traffic light, a guard rail, a curb, a road sign, a road marking, a lane marking, and a tree. The external recognition system 90 can be provided with external sensors such as a lidar and a sonar in addition to the units 92 to 94.

The front camera unit 92 is, for example, a monocular or compound-eye camera which is installed near a rearview mirror of the own vehicle A. The front camera unit 92 is directed in a traveling direction of the own vehicle A and, for example, capable of capturing an image of a range of approximately 80 meters from the own vehicle A at a horizontal viewing angle of approximately 45 degrees. The front camera unit 92 successively outputs data of captured images which include a moving object and a stationary object to the surroundings monitoring ECU 91.

The radar unit 93 is installed in, for example, a front part of the own vehicle A. The radar unit 93 emits a 77 GHz band millimeter wave in the traveling direction of the own vehicle A from a transmission antenna. The radar unit 93 receives a millimeter wave reflected by a moving object or a stationary object in the traveling direction by a reception antenna. The radar unit 93 is capable of scanning, for example, a range of approximately 60 meters from the own vehicle A at a horizontal scanning angle of approximately 55 degrees. The radar unit 93 successively outputs scanning results based on received signals to the surroundings monitoring ECU 91.

The radar unit 94 is installed at, for example, each of right and left sides of a rear part of the own vehicle A. Each radar unit 94 emits a 24 GHz band submillimeter wave toward the rear lateral side of the own vehicle A from a transmission antenna. The radar unit 94 receives a submillimeter wave reflected by a moving object or a stationary object on the rear lateral side by a reception antenna. The radar unit 94 is capable of scanning, for example, a range of approximately 30 meters from the own vehicle A at a horizontal scanning angle of approximately 120 degrees. The radar unit 94 successively outputs scanning results based on received signals to the surroundings monitoring ECU 91.

The surroundings monitoring ECU 91 is mainly composed of a microcomputer or a microcontroller which includes a processor, a RAM, and a memory. The surroundings monitoring ECU 91 is communicably connected to the front camera unit 92, each of the radar units 93, 94, and the communication bus 99. The surroundings monitoring ECU 91 detects relative positions of a moving object and a stationary object which are present in the traveling direction by integrating information items acquired from the respective units 92, 93. In addition, the surroundings monitoring ECU 91 detects relative positions of a moving object and a stationary object which are present on the rear side and the rear lateral side from information acquired from the radar units 94.

The surroundings monitoring ECU 91 outputs, as monitoring information, relative positional information of a preceding vehicle A1 (refer to FIG. 6) and a parallelly traveling vehicle which travel around the own vehicle A, information indicating the degree of congestion around the own vehicle A, and shape information of a lane marking in the traveling direction of the own vehicle A to the communication bus 99. In addition, the surroundings monitoring ECU 91 determines whether a lane change to an adjacent lane is possible on the basis of detection of a parallelly traveling vehicle traveling on the adjacent lane, and outputs a result of the determination as monitoring information to the communication bus 99.

The vehicle control system 60 is provided with detection sensors which detect a driving operation including an accelerator position sensor 61, a brake pedal force sensor 62 and a steering angle sensor 63, and a vehicle speed sensor 64 which detects a traveling state of the own vehicle A. In addition, the vehicle control system 60 is provided with traveling control devices including an electronic control throttle 66, a brake actuator 67 and an electric power steering (EPS) motor 68, and a vehicle control ECU 70. The vehicle control system 60 controls traveling of the own vehicle A on the basis of a driving operation by the driver and monitoring information obtained by the external recognition system 90.

The accelerator position sensor 61 detects the amount by which an accelerator pedal is depressed by the driver and outputs the detected amount to the vehicle control ECU 70. The brake pedal force sensor 62 detects a brake pedal force of the brake pedal 124 depressed by the driver and outputs the detected force to the vehicle control ECU 70. The steering angle sensor 63 detects a steering angle of a steering wheel (hereinbelow, referred to as the steering) 16 by the driver and outputs the detected steering angle to the vehicle control ECU 70. Operation information of the driver acquired by each of the sensors 61 to 63 is output to the vehicle control ECU 70 and then output to the communication bus 99 through the vehicle control ECU 70. The vehicle speed sensor 64 measures a rotation speed of an output shaft of a transmission or an axle to detect the current traveling speed of the own vehicle A and outputs the detected current traveling speed to the vehicle control ECU 70.

The electronic control throttle 66 controls the degree of opening of a throttle on the basis of a control signal output from the vehicle control ECU 70. The brake actuator 67 controls a braking force generated in each wheel by generating a brake pressure based on a control signal output from the vehicle control ECU 70. The EPS motor 68 controls a steering force and a steering retention force which are applied to a steering mechanism on the basis of a control signal output from the vehicle control ECU 70.

The vehicle control ECU 70 includes one or more kinds selected from a power unit control ECU, a brake control ECU, and an integrated control ECU, and includes at least the integrated control ECU. A control circuit 70a of the vehicle control ECU 70 includes a processor 71, a rewritable nonvolatile memory 73, an input/output interface 74 which performs input and output of information, and a bus which connects the processor 71, the memory 73, and the input/output interface 74. The vehicle control ECU 70 is connected to each of the sensors 61 to 64 and each of the traveling control devices. The vehicle control ECU 70 acquires a detection signal output from each of the sensors

61 to 64 and outputs a control signal to each of the traveling control devices. The vehicle control ECU 70 is connected to the communication bus 99 and communicable with the HCU 20 and the surroundings monitoring ECU 91. The vehicle control ECU 70 is capable of outputting the detection signal of each of the sensors 61 to 64 to the communication bus 99.

The vehicle control ECU 70 is capable of controlling at least either acceleration/deceleration or steering of the own vehicle A and provided with a plurality of driving support functions which support or substitute a driving operation by the driver. The driving support function substantially implements automatic driving. The vehicle control ECU 70 executes a program stored in the memory 73 by the processor 71 to construct an LTC functional section 81, an LCA function section 82, an automatic merging function section 83, and a travel plan setting section 84 illustrated in FIG. 3 as functional blocks.

The lane trace control (LTC) function section 81 generates a steering force in the direction for preventing an approach to a lane marking to implement a lane-center maintaining function which maintains the own vehicle A (refer to FIG. 1) at the center of a current traveling lane. In addition, the LTC function section 81 implements a lane departure preventing function which prevents a departure from the current traveling lane. These functions enable the LTC function section 81 to cause the own vehicle A to travel along the lane. Further, when the own vehicle A passes a large-size vehicle A2 (refer to FIG. 8) traveling on an adjacent lane, the LTC function section 81 performs offset traveling which moves the own vehicle A to the side far from the large-size vehicle A2 within the current traveling lane.

The lane change assist (LCA) function section 82 implements the function of lane change assist which moves the own vehicle A (refer to FIG. 1) from the current traveling lane to an adjacent lane. When a lane change to an adjacent lane is possible, the LCA function section 82 generates a steering force in the direction toward the adjacent lane to move the own vehicle A to the adjacent lane.

The automatic merging function section 83 implements the function of automatic merging which causes the own vehicle A (refer to FIG. 1) traveling on a rampway or a merging lane to merge into a main through lane of an expressway or the like. The automatic merging function section 83 generates a driving force or a braking force on an acceleration lane which is located along the main through lane to increase or reduce the traveling speed of the own vehicle A to the traveling speed of another vehicle A3 (refer to FIG. 10) traveling on the main through lane (travel lane). When a lane change to the main through lane is possible, the automatic merging function section 83 generates a steering force in the direction toward the main through lane to move the own vehicle A to the adjacent lane.

The travel plan setting section 84 generates a travel plan of the own vehicle A (refer to FIG. 1) on the basis of monitoring information acquired from the surroundings monitoring ECU 91, the ADAS locator 96, and the ITS communication device 97. The travel plan is information indicating the details of acceleration/deceleration control and steering control of the own vehicle A which are scheduled to be performed by each of the function sections 81 to 83. The travel plan includes, for example, a short-term travel plan such as an adjustment of the traveling speed or a movement to an adjacent lane and a medium-term travel plan which is a combination of a plurality of short-term travel plans. At least either an acceleration/deceleration schedule or a steering schedule for causing the own vehicle A to travel along a scheduled travel track is set in these travel plans. The acceleration/deceleration schedule defines a target acceleration TG in a front-back direction and a target speed change amount TS as control target values TV. The steering schedule defines a steering direction, a target steering angle, and a target movement amount TM in total in a lateral direction as control target values TV. Each of the function sections 81 to 83 controls the behavior of the own vehicle A on the basis of these control target values TV defined by the travel plan setting section 84.

When the travel plan setting section 84 generates short-term and medium-term travel plans including the control target values TV, the travel plan setting section 84 immediately outputs the generated travel plans to the communication bus 99 (refer to FIG. 2). In addition, each of the function sections 81 to 83 successively outputs control information of acceleration/deceleration control and steering control performed on the basis of the travel plans to the communication bus 99.

The HMI system 10 is provided with a plurality of display devices including a combination meter 12, a CID 13, and an HUD device 14 in addition to the HCU 20 illustrated in FIGS. 1 and 2. The HMI system 10 is further provided with an audio speaker 15, a footrest control mechanism 110, and a steering vibrating mechanism 115. The HMI system 10 presents information to a driver of the own vehicle A who is seated on a driver's seat 17*d* and the other occupants of the own vehicle A using each of the configurations.

The combination meter 12 is disposed in front of the driver's seat 17*d*. The combination meter 12 displays various images for information notification on the basis of image data acquired from the HCU 20. The center information display (CID) 13 is disposed above a center duster inside a vehicle cabin of the own vehicle A. A liquid crystal display of the CID 13 is visually recognizable not only by the driver, but also by the occupants of the vehicle except the driver, for example, an occupant who is seated on a passenger seat 17*p*. The CID 13 displays various images for information notification on a display screen of the liquid crystal display on the basis of image data acquired from the HCU 20.

Figure 5:
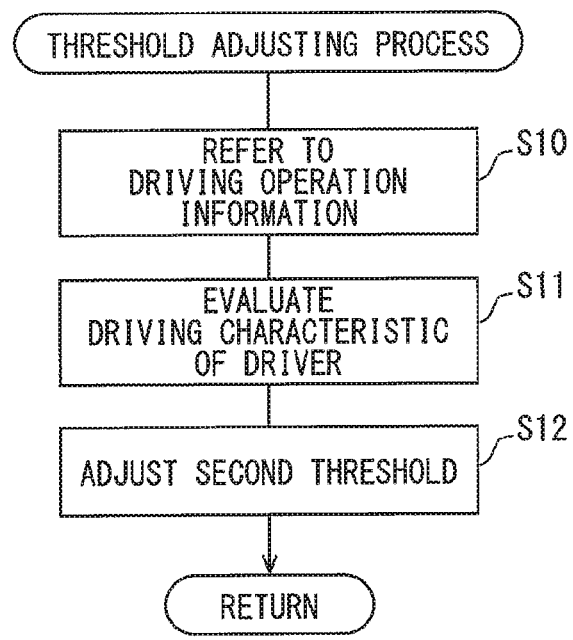
FIG. 5 is a flowchart illustrating a threshold adjusting process performed by a behavior change determination section.

The head-up display (HUD) device 14 projects light of an image based on image data acquired from the HCU 20 onto a projection area 14*a* (also refer to FIG. 5 and the like) which is defined on a windshield 18. Light of the image reflected by the windshield 18 toward the inside of the vehicle cabin is perceived by the driver seated on the driver's seat 17*d*. The driver can visually recognize a virtual image of the image projected by the HUD device 14 which is superimposed on outside scenery ahead of the own vehicle A. The HUD device 14 presents information to the driver with a display object which is virtually displayed.

The audio speaker 15 is disposed within a lining of a door of the own vehicle A. The audio speaker 15 is located at the lateral side of each of the driver's seat 17*d* and the passenger seat 17*p*. The audio speaker 15 reproduces a sound or voice that is audible by all the occupants of the own vehicle A. Specifically, the audio speaker 15 outputs a mechanical beep sound such as "pong" or "pip" or a synthetic voice such as a message. The audio speaker 15 is capable of performing information presentation to all the occupants with a reproduced sound or voice.

The footrest control mechanism 110 is capable of changing the attitude of a footrest 113 where the left foot of the driver is placed. The footrest control mechanism 110 includes an actuator 112 and a footrest driving unit 111 in addition to the footrest 113. The actuator 112 is capable of changing the attitude of the footrest 113 from a reference attitude for normal times. The footrest driving unit 111 drives the actuator 112 to tilt the footrest 113 back and forth and right and left. The footrest driving unit 111 sets a displacement direction of the footrest 113 on the basis of a control signal acquired from the HCU 20. The footrest control mechanism 110 is capable of performing information presentation through the sense of touch of the driver by the operation of the footrest 113.

The steering vibrating mechanism 115 is buried in a rim part of the steering 16. The steering vibrating mechanism 115 generates vibrations in the rim part of the steering 16 touched by the driver. The steering vibrating mechanism 115 is capable of performing information presentation through the sense of touch of the driver with vibrations generated in the rim part. The steering vibration mechanism 115 is capable of changing the number of vibrations to be felt by the driver.

The HCU 20 is provided with a control circuit 20a which includes a main processor 21, a drawing processor 22, a rewritable nonvolatile memory 23, an input/output interface 24 which performs input and output of information, and a bus which connects the main processor 21, the drawing processor 22, the memory 23, and the input/output interface 24. The HCU 20 is connected to each of the display devices, the audio speaker 15, the footrest control mechanism 110, and the steering vibrating mechanism 115.

The HCU 20 controls information presentation by an information presentation device 40 which includes, for example, the HUD device 14, the audio speaker 15, and the footrest control mechanism 110 on the basis of a travel plan acquired from the vehicle control ECU 70. Accordingly, the HCU 20 can notify an occupant, such as the driver, of an operating state of the vehicle control system 60, that is, a change in the behavior of the own vehicle A caused by the driving support function.

In order to implement such information presentation, the control circuit 20a of the HCU 20 executes a presentation control program stored in the memory 23 by each of the processors 21, 22. Accordingly, the control circuit 20a constructs a travel plan acquisition section 31, an operation information acquisition section 32, a behavior change determination section 33, a control information acquisition section 34, and a presentation execution section 35 as functional blocks. Hereinbelow, the details of these functional blocks relating to information presentation will be described with reference to FIG. 4, and further to FIGS. 1 to 3.

The travel plan acquisition section 31 acquires short-term and medium-term travel plans generated by the travel plan setting section 84. As described above, the travel plans include a plurality control target values TV relating to the magnitude of a behavior change of the own vehicle A including the target acceleration TG in the front-back direction, the target speed change amount TS, and the target movement amount TM in the lateral direction.

The operation information acquisition section 32 acquires a transition of a driving operation input by the driver in a manual driving state in which all the driving support functions by the respective function sections 81 to 83 are stopped and the driver performs a driving operation of the own vehicle A. Specifically, the operation information acquisition section 32 continuously acquires operation information of an acceleration/deceleration operation and a steering operation based on a detection signal of each of the sensors 61 to 63.

The behavior change determination section 33 determines whether a large behavior change is scheduled in the own vehicle A in a state where the driving support function by each of the function sections 81 to 83 is active. Specifically, the behavior change determination section 33 determines, on the basis of a medium-term or short-term travel plan acquired by the travel plan acquisition section 31, whether a control target value TV included in the travel plan is larger than a second threshold TH2 corresponding to the control target value TV (refer to S102 in FIG. 12). The second threshold TH2 is set to be smaller than a control target value TV in a case where a behavior change that is likely to cause each occupant including the driver to feel anxiety is performed.

In addition, the behavior change determination section 33 determines whether the control target value TV is larger than a first threshold TH1. The first threshold TH1 is a value smaller than the second threshold TH 2. The first threshold TH1 is previously set to be larger than each control target value TV of acceleration/deceleration or steering performed by each of the function sections 81 to 83 in order to correct a behavior change of the own vehicle A caused by a disturbance.

The behavior change determination section 33 stores a first threshold TH1 and a second threshold TH2 corresponding to each control target value TV. For example, two acceleration thresholds THG1, THG2 are set for evaluating the magnitude of the target acceleration TG in the front-back direction. Similarly, two speed difference thresholds THS1, THS2 are set for evaluating the magnitude of the target speed change amount TS. Further, two movement amount thresholds THM1, THM2 are set for evaluating the target movement amount TM in the lateral direction.

The behavior change determination section 33 appropriately adjusts each of the second thresholds TH2 (THG2, THM2, THM2) according to a characteristic of a driver on the basis of operation information of the driver acquired by the operation information acquisition section 32. Such a threshold adjusting process is repeatedly performed in a manual driving state of the own vehicle A. In the threshold adjusting process, the behavior change determination section 33 refers to operation information of the driver successively acquired by the operation information acquisition section 32 (refer to S10 in FIG. 5) and evaluates the driving characteristic of the driver on the basis of the acquired operation information (refer to S11 in FIG. 5). When a result of the evaluation shows that the driver frequently performs a sudden acceleration, a sudden deceleration, and a sudden turn of the steering wheel, each of the second thresholds TH2 is adjusted to a value higher than an initially set standard value. On the other hand, when a driving operation by the driver is calm, each of the second thresholds TH2 is adjusted to a value lower than the standard value (refer to S12 in FIG. 5).

The control information acquisition section 34 acquires, in real time, control information of each of acceleration/deceleration control and steering control successively output from the function sections 81 to 83 in a state where the behavior of the own vehicle A is controlled by each of the function sections 81 to 83.

The presentation execution section 35 successively presents an operating state of the driving support function by each of the function sections 81 to 83 to the driver on the basis of a travel plan acquired by the travel plan acquisition section 31 and control information acquired by the control information acquisition section 34. Specifically, the presentation execution section 35 changes a mode of a control status image 50 which is virtually displayed by the HUD device 14 to present the details of control performed in each of the function sections 81 to 83 to the driver. In addition to such display, the presentation execution section 35 changes at least either the frequency or volume of a sound output from the audio speaker 15 to present the details of control performed in each of the function sections 81 to 83 to the driver. In addition, the presentation execution section 35 changes the attitude of the footrest 113 to present the details of control performed in each of the function sections 81 to 83 to the driver.

The presentation execution section 35 changes a method for presenting the details of control to the driver on the basis of a result of determination by the behavior change determination section 33. Specifically, in a normal state where no large behavior change is scheduled, the presentation execution section 35 presents the details of control performed by each of the function sections 81 to 83 to the driver in accordance with a behavior change occurring in the own vehicle A. On the other hand, when a large behavior change is scheduled in the own vehicle A, the presentation execution section 35 presents the details of control performed by each of the function sections 81 to 83 temporarily in advance of an actual behavior change. Further, when a behavior change scheduled in the own vehicle A is a slight change such as correction of a disturbance, the presentation execution section 35 does not reflect the details of control performed by each of the function sections 81 to 83 in presentation.

Figure 3:
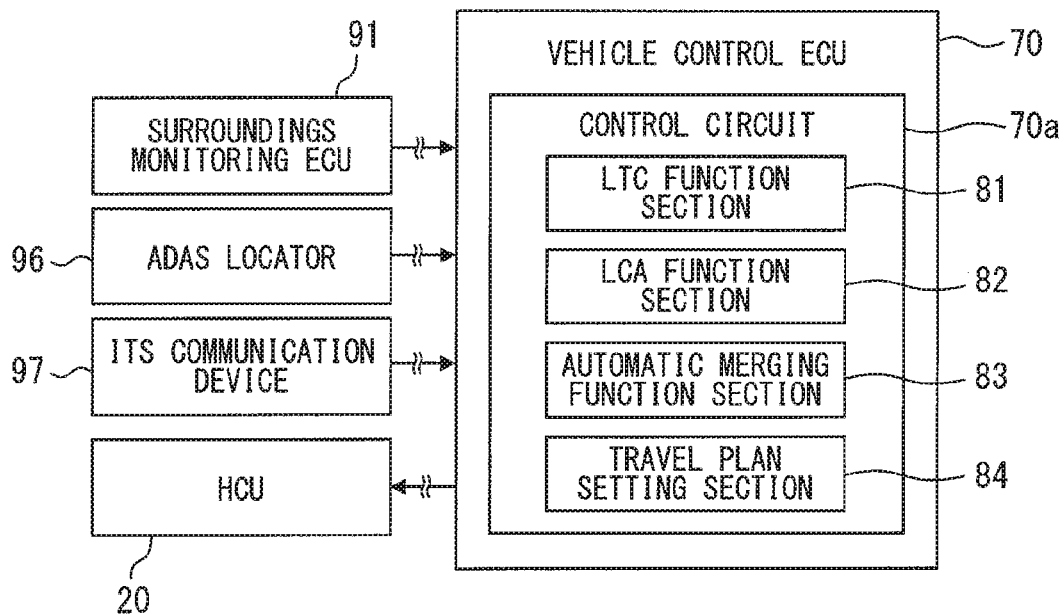
FIG. 3 is a diagram illustrating functional blocks constructed in a control circuit of a vehicle control ECU.
Figure 4:
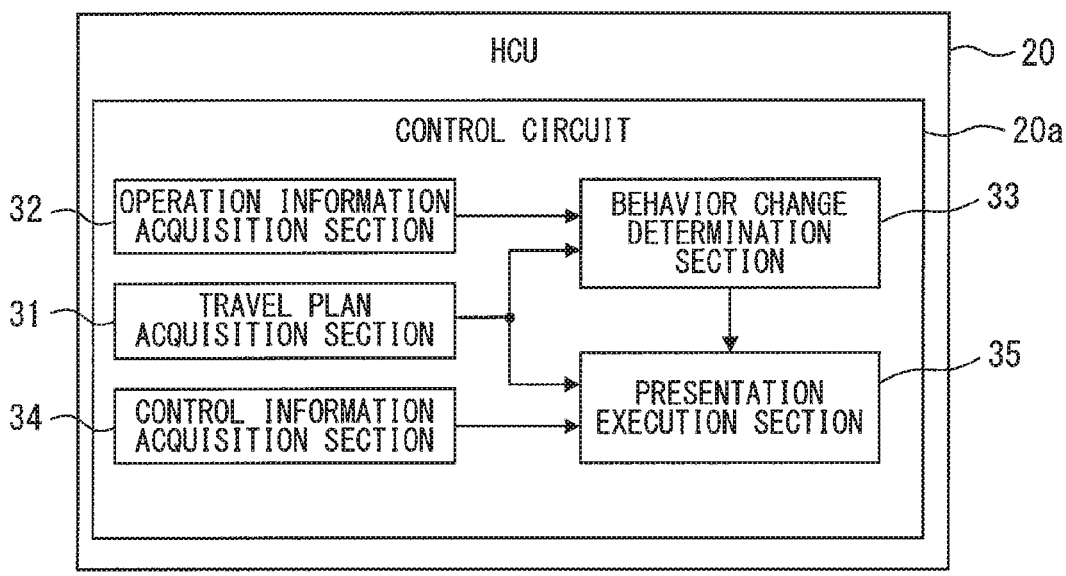
FIG. 4 is a diagram illustrating functional blocks constructed in a control circuit of an HCU.

The details of an information presentation control method implemented by the presentation execution section 35 described above will be described with reference to FIGS. 6 to 11, and further to FIGS. 1, 3, and 4. In particular, details relating to a mode change of the control status image 50 by the HUD device 14 will be mainly described. The control status image 50 according to the first embodiment includes a plurality of lane marking image portions 51a to 51c and an arrow image portion 52. The control status image 50 is a graphical user interface (GUI) that notifies a vehicle behavior by sequentially displaying a plurality of frame-divided still images. The lane marking image portions 51a to 51c represent lane markings recognized by the surroundings monitoring ECU 91 on both sides of the own vehicle. The arrow image portion 52 represents the behavior of the own vehicle A such as acceleration/deceleration or a movement in the lateral direction.

A movement of each of the arrow image portion 52 and the footrest 113 which perform information presentation is previously standardized with respect to each of a lateral movement and acceleration/deceleration as described below. For example, when the own vehicle A moves in the lateral direction, the tip of the arrow image portion 52 slides in the lateral direction and the footrest 113 tilts in the lateral direction in synchronization with the behavior of the own vehicle A. Similarly, when the own vehicle A accelerates or decelerates, the arrow image portion 52 expands or contracts in the longitudinal direction and the footrest 113 tilts in the front-back direction in synchronization with the behavior of the own vehicle A.

As described below, the arrow image portion 52 and the footrest 113 are capable of presenting the details of control scheduled in each of the function sections 81 to 83 temporarily in advance of an actual behavior change. As described above, the movement of each of the arrow image portion 52 and the footrest 113 is standardized. Thus, a movement of each of the arrow image portion 52 and the footrest 113 with a more advanced step (progress) than that in a synchronous case enables the driver to recognize that the advance presentation is under execution.

Figure 6:
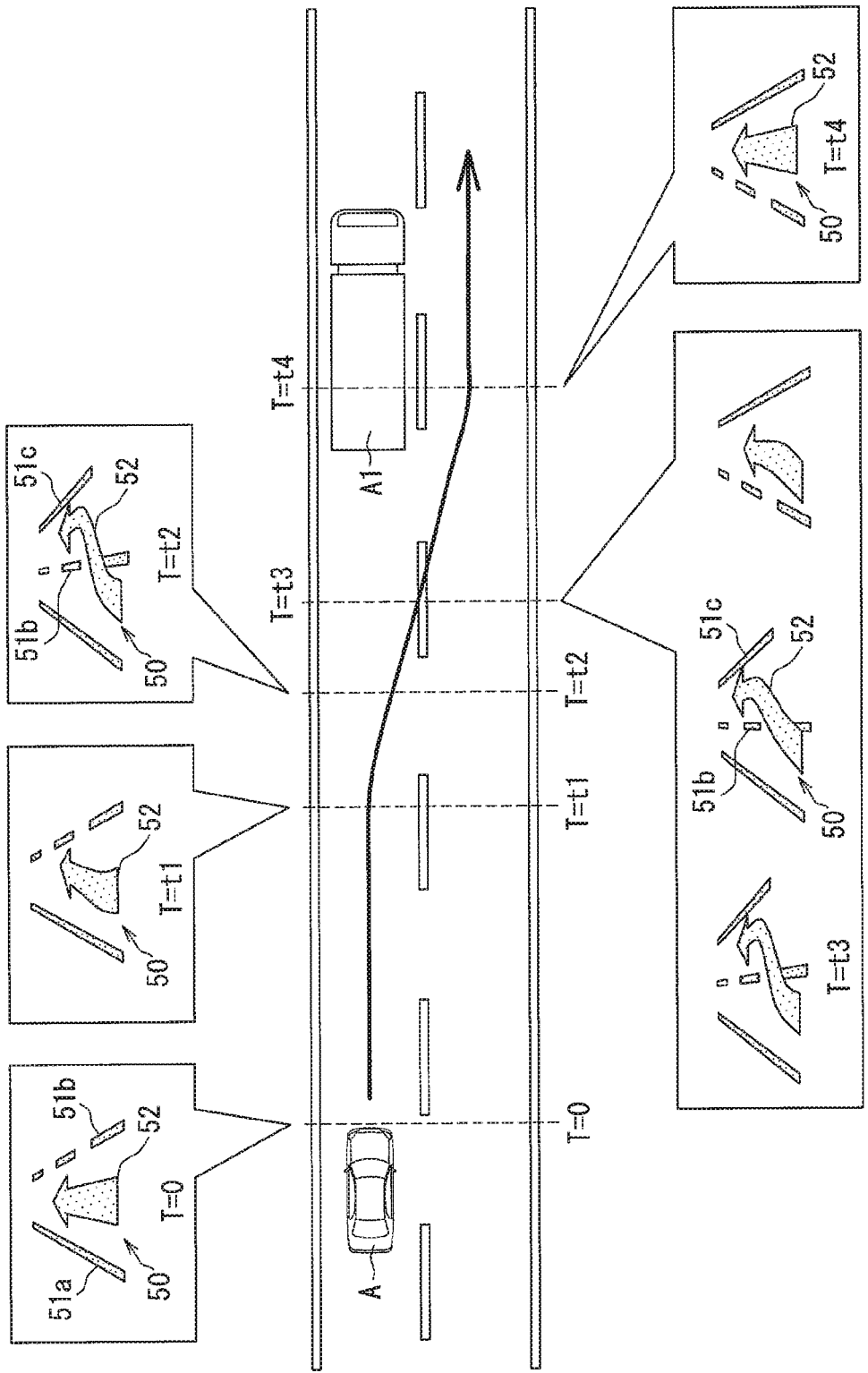
FIG. 6 is a diagram illustrating an example of a scene in which advance presentation is performed in the first embodiment.

A scene illustrated in FIG. 6 is a concrete example of a scene in which such advance presentation is performed. In the scene, the own vehicle A passes the preceding vehicle A1 traveling at a lower speed than the own vehicle A by control of the own vehicle A by the LCA function section 82. In such a scene, the travel plan setting section 84 generates a short-term travel plan that moves the own vehicle A to a passing lane which is adjacent on the right side to pass the preceding vehicle A1. The behavior change determination section 33 determines that the target movement amount TM in the lateral direction (the width of one lane) is larger than the movement amount threshold THM2 with respect to the travel plane for the lane change. Thus, in at least a part of a period (t1 to t4) during which the lane change is performed, the details of the control by the LCA function section 82 are presented temporarily in advance of an actual behavior change.

The progress of the vehicle behavior and the progress of the GUI will be described in order on a time-series basis with reference to FIGS. 6 and 7. In a period (0 to t1) before the start of the lane change control by the LCA function section 82, a mode change of each of the lane marking image portions 51a, 51b and the arrow image portion 52 synchronizes with or follows a behavior change of the own vehicle A. Specifically, in the control status image 50, the arrow image portion 52 which linearly extends in a vertical direction is located between the two lane marking image portions 51a, 51b. In addition, the audio speaker 15 outputs a voice that notifies actuation of the LCA function section 82. Further, the footrest control mechanism 110 links a right-left movement of the footrest 113 with steering of the own vehicle A.

The control status image 50 starts advance presentation of the details of control scheduled in the LCA function section 82 at the timing (t1) when the LCA function section 82 starts the steering control based on the travel plan. The advance presentation is performed until the middle of the lane change performing period (t1 to t4). In the first embodiment, the advance presentation is temporarily performed only in a period (t1 to t3) before the own vehicle A crosses the right lane marking. In such a lane change, the control status image 50 moves the position of the tip (upper end) of the arrow image portion 52 in the lateral direction (rightward) while maintaining the position of the base end (lower end) thereof. The arrow image portion 52 is deformed into a curved shape.

The control status image 50 causes the arrow image portion 52 to cross the right lane marking image portion 51b at the timing (t2) that is earlier than the own vehicle A actually crosses the right lane marking. As a result, the arrow image portion 52 is deformed into a mode in which the tip thereof is located between the two lane marking image portions 51b, 51c which define a passing lane on the display. With such display, the control status image 50 indicates an arrival position of the own vehicle A by the position of the tip and notifies the driver in advance of a result of the behavior change of the own vehicle A with the lane change. In addition, in this period (t1 to t2), at least either the frequency or volume of a sound output by the audio speaker 15 is conspicuously changed, and the footrest 113 is conspicuously tilted in the right direction from the reference position as advance presentation of the details of the control.

The control status image 50 maintains the mode of the arrow image portion 52 which crosses the lane marking image portion 51b until the timing (t3) when the own vehicle A actually crosses the lane marking. In addition, in this period (t2 to t3), the frequency or volume of the sound output by the audio speaker 15 and the attitude of the footrest 113 are maintained constant. Then, when a step in which the own vehicle A actually crosses over the lane marking has arrived, the control status image 50 moves the position of the base end of the arrow image portion 52 in the lateral direction (rightward) toward the passing lane on the display in accordance with the movement of the own vehicle A in the lateral direction. As a result, at the timing (t4) when the lane change based on the travel plan is completed, the arrow image portion 52 returns to a linear form that reflects the behavior of the own vehicle A traveling straight ahead. In addition, in this period (t3 to t4), the frequency or volume of the sound output by the audio speaker 15 is gradually returned to a state before the change. Similarly, the attitude of the footrest 113 is gradually returned to the reference position from the tilted state in the right direction.

Figure 7:
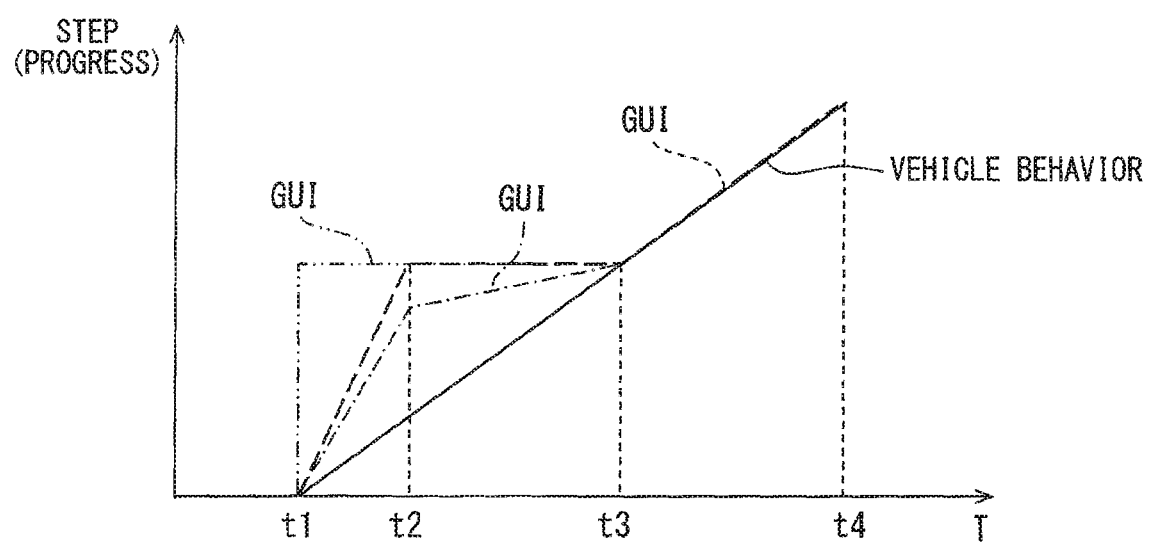
FIG. 7 is a diagram illustrating the correspondence relationship between the progress of a vehicle behavior and the progress of a GUI in the scene in which the advance presentation is performed.

As a modification of the above, the control status image 50 may skip a frame that represents the movement between t1 and t2 at the steering control start timing (t1) to momentarily change the arrow image portion 52 from the mode at t1 to the form at t2 (refer to a two-dot chain line in FIG. 7). As another modification, the control status image 50 may not maintain the arrow image portion 52 in a still state between t2 and t3, but change the mode of the arrow image portion 52 between t2 and t3 with a movement slower than the movement between t1 and t2 (refer to a dash-dot line in FIG. 7).

Figure 8:
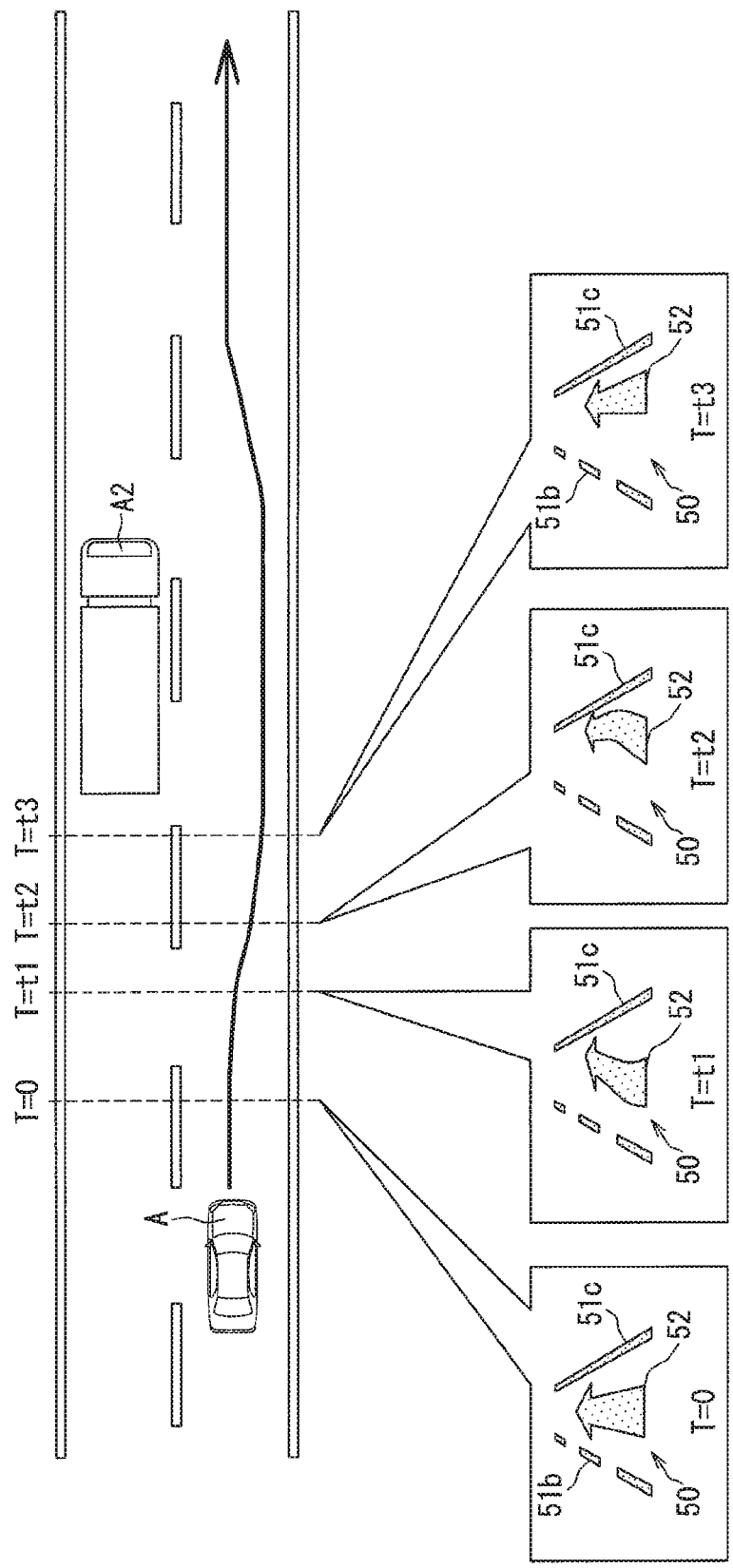
FIG. 8 is a diagram illustrating an example of a scene in which no advance presentation is performed in the first embodiment.

FIG. 8 illustrates a scene in which the own vehicle A passes the large-size vehicle A2 traveling on an adjacent lane by control of the own vehicle A by the LTC function section 81. In such a scene, the travel plan setting section 84 generates a short-term travel plan that moves the traveling position of the own vehicle A to the right side within the current traveling lane when the own vehicle A passes the large-size vehicle A2. Such offset traveling secures a distance between the large-size vehicle A2 and the own vehicle A, which eases the anxiety of each occupant including the driver. The behavior change determination section 33 determines that the target movement amount TM in the lateral direction is equal to or smaller than the movement amount threshold THM2 and larger than the movement amount threshold THM1 with respect to the travel plan for such offset traveling. Thus, in the entire period (t1 to t4) during which the offset of the own vehicle A is performed, the details of the control by the LCA function section 82 are reflected in the control status image 50, and the movement of the control status image 50 synchronizes with or follows a behavior change of the own vehicle A.

Figure 9:
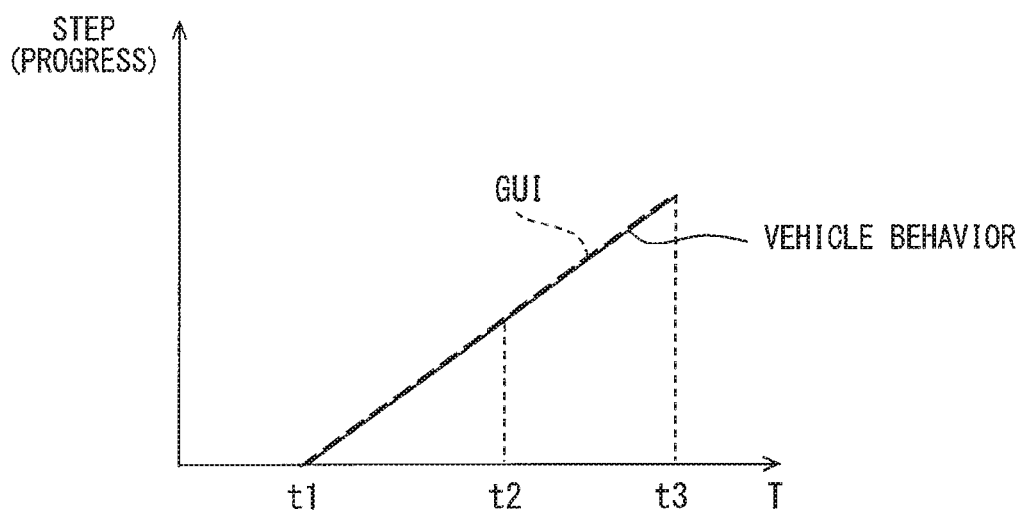
FIG. 9 is a diagram illustrating the correspondence relationship between the progress of a vehicle behavior and the progress of the GUI in the scene in which no advance presentation is performed.

Description will be made in order on a time-series basis with reference to FIGS. 8 and 9. At the timing (t1) when the LTC function section 81 starts the steering control for the offset on the basis of the travel plan, the control status image 50 slightly moves the tip of the arrow image portion 52 in the lateral direction (rightward). As a result, in a period (t1 to t2) during which the own vehicle A approaches the right lane marking, the arrow image portion 52 has a form in which the tip thereof is close to the right lane marking image portion 51c. In addition, in this period (t1 to t2), the footrest control mechanism 110 slightly tilts the footrest 113 in the right direction from the reference position.

Then, when the own vehicle A has been moved close to the right lane marking, and the offset has been completed (t3), the control status image 50 moves the position of the base end of the arrow image portion 52 rightward. As a result, the arrow image portion 52 is brought into a linear form that is closer to the right lane marking image portion 51c than to the left lane marking image portion 51b in synchronization with the behavior of the own vehicle A traveling straight ahead. In addition, the footrest control mechanism 110 returns the footrest 113 to the reference position.

Figure 10:
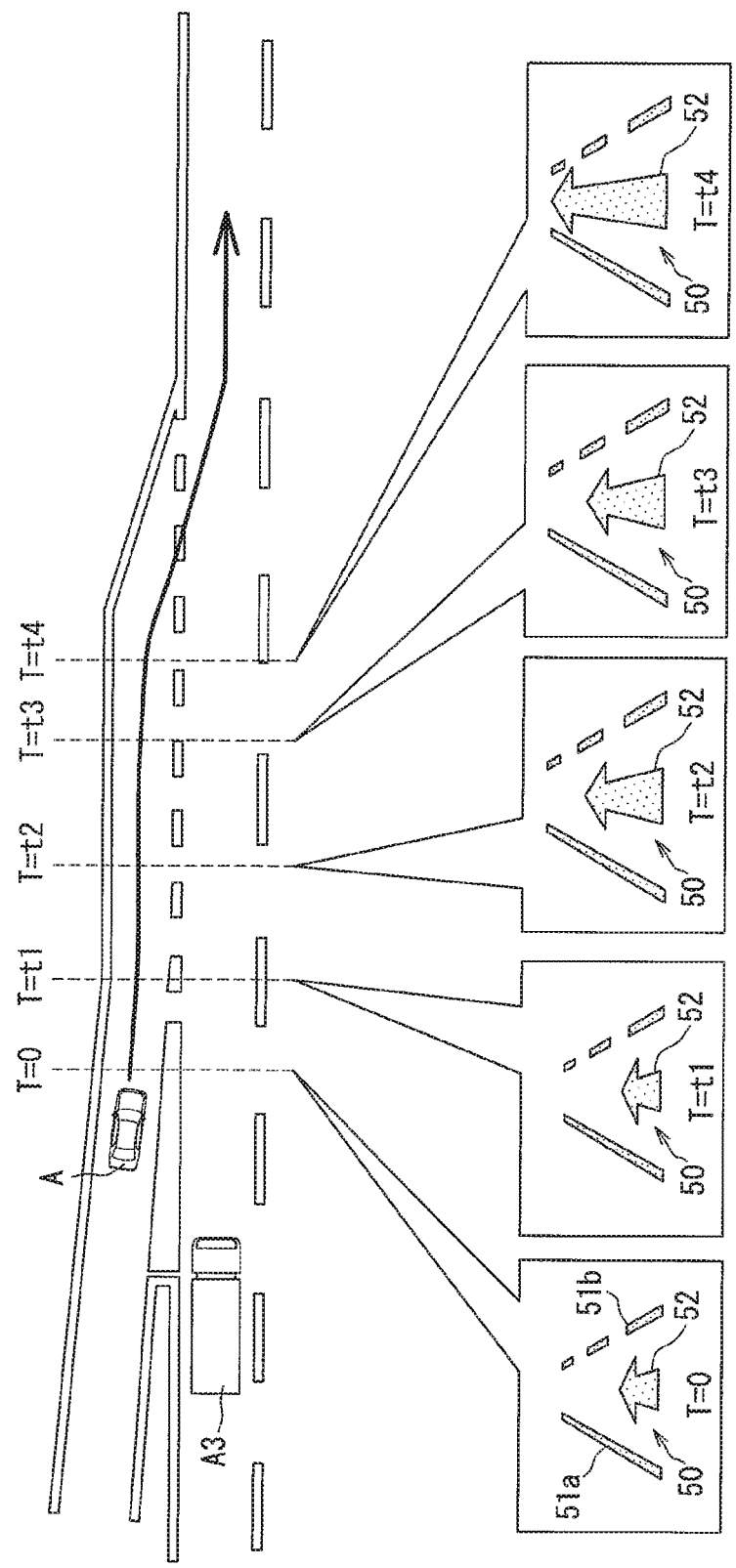
FIG. 10 is a diagram illustrating another example of the scene in which the advance presentation is performed.
Figure 11:
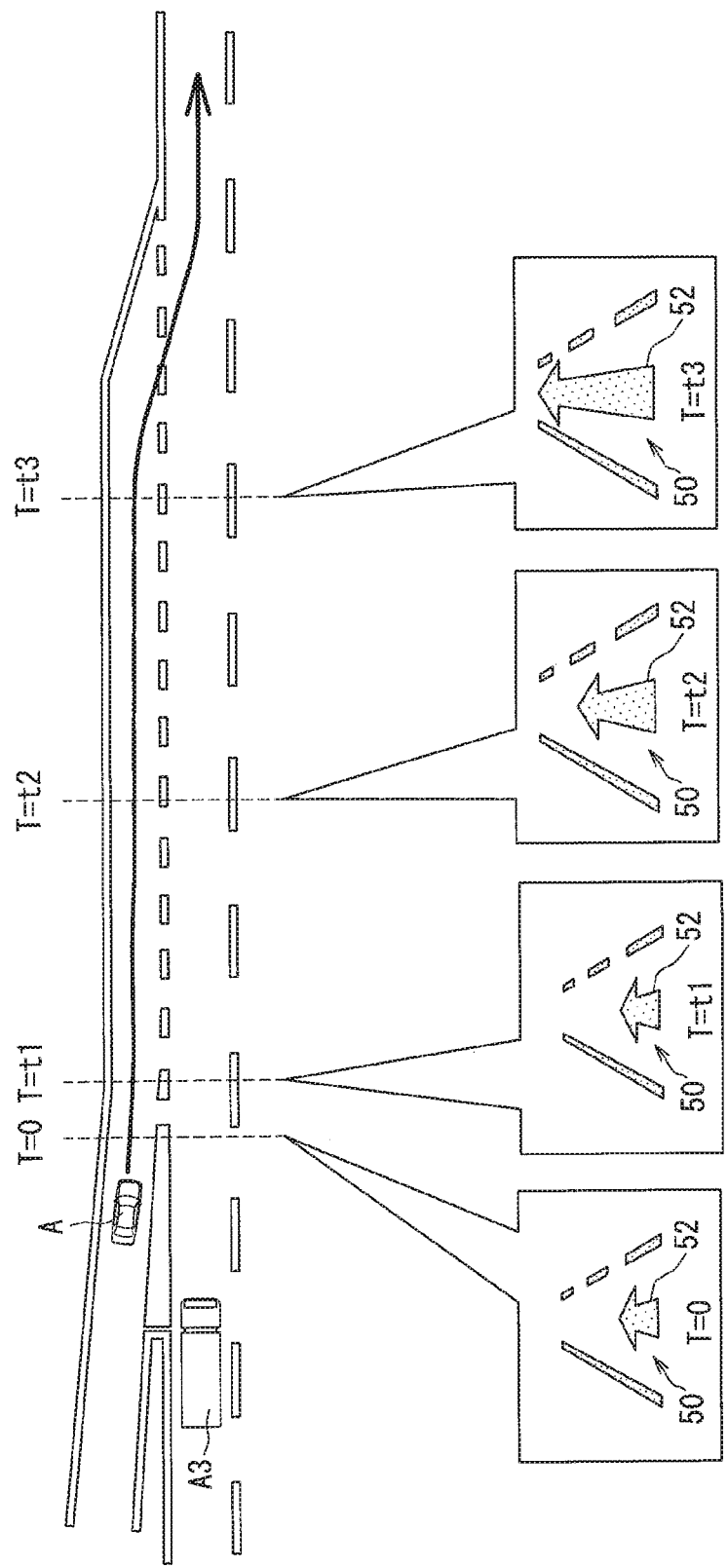
FIG. 11 is a diagram illustrating another example of the scene in which no advance presentation is performed.

FIGS. 10 and 11 illustrate scenes in which the own vehicle A traveling on a rampway or a merging lane is caused to merge into a main through lane of an expressway or the like by control of the own vehicle A by the automatic merging function section 83. The travel plan setting section 84 acquires positional information and travel speed information of another vehicle A3 traveling on the main through lane by vehicle-to-vehicle communication with the vehicle A3 or road-to-vehicle communication with the roadside device using the ITS communication device 97. In addition, the travel plan setting section 84 acquires the length of an acceleration lane which is located along the main through lane from road information from the ADAS locator. The travel plan setting section 84 generates a medium-term travel plan that causes the own vehicle A to merge into the main through lane and a short-term travel plan that adjusts the traveling speed of the own vehicle A before the merging using these pieces of information.

In the scene illustrated in FIG. 10, it is necessary to adjust the traveling speed within a short acceleration section. Thus, the behavior change determination section 33 determines that the target acceleration TG in the front-back direction (0.2 G) is larger than the acceleration threshold THG2 (e.g., 0.15 G) with respect to the short-term travel plan that accelerates the own vehicle A within the short acceleration section. Thus, in at least a part of a period (t1 to t4) during which the own vehicle A is accelerated, the details of the control by the automatic merging function section 83 is presented temporarily in advance of an actual behavior change.

The progress of the vehicle behavior and the progress of the GUI will be described in order on a time-series basis with reference to FIGS. 10 and 7. In a period (0 to t1) before the start of the acceleration control by the automatic merging function section 83, a mode change of the arrow image portion 52, a change in a sound output by the audio speaker 15, and an attitude change of the footrest 113 synchronize with or follow a behavior change of the own vehicle A. In this case, the arrow image portion 52 is disposed on the center between the two lane marking image portions 51a, 51b and indicates the traveling speed of the own vehicle A by the length in the vertical direction.

The control status image 50 starts advance presentation of the details of control scheduled in the automatic merging function section 83 at the timing (t1) when the automatic merging function section 83 starts the acceleration control based on the travel plan. The advance presentation is performed until the middle of the acceleration performing period (t1 to t4). The advance presentation is temporarily performed only in a period (t1 to t3) before the traveling speed of the own vehicle A reaches a target intermediate speed. The target intermediate speed is set at an intermediate value between a target arrival speed which is an arrival target in the short-term travel plan and the current traveling speed. The control status image 50 moves the position of the tip of the arrow image portion 52 upward while maintaining the position of the base end thereof. The arrow image portion 52 is deformed into a shape extending in the vertical direction.

The control status image 50 extends the arrow image portion 52 up to a length corresponding to the target intermediate speed at the timing (t2) that is earlier than the traveling speed of the own vehicle A reaches the target intermediate speed. With such a change in the length of the arrow image portion 52, the control status image 50 notifies the driver in advance of the performance of strong acceleration. In addition, in this period (t1 to t2), at least either the frequency or volume of a sound output by the audio speaker 15 is conspicuously increased, and the footrest 113 is conspicuously tilted forward from the reference position as advance presentation of the details of the control.

The control status image 50 maintains the length of the arrow image portion 52 until the timing (t3) when the traveling speed of the own vehicle A actually reaches the target intermediate speed. In addition, in this period (t2 to t3), the frequency or volume of the sound output by the audio speaker 15 and the attitude of the footrest 113 are maintained constant. Then, when a step in which the traveling speed of the own vehicle A exceeds the target intermediate speed has arrived, the control status image 50 further moves the position of the upper end of the arrow image portion 52 upward in accordance with the acceleration of the own vehicle A. As a result, at the timing (t4) when the acceleration based on the travel plan is completed, the arrow image portion 52 extends up to a length that reflects the traveling speed of the own vehicle A. In addition, in this period (t3 to t4), the frequency or volume of the sound output by the audio speaker 15 is further gradually increased. Similarly, the footrest control mechanism 110 further tilts the footrest 113 forward.

As a modification of the above, the control status image 50 may skip a frame that represents the movement between t1 and t2 at the acceleration start timing (t1) to momentarily change the arrow image portion 52 from the mode at t1 to the form at t2 (refer to a two-dot chain line in FIG. 7). As another modification, the control status image 50 may not maintain the arrow image portion 52 in a still state between t2 and t3, but gradually extends the arrow image portion 52 between t2 and t3 with a movement slower than the movement between t1 and t2 (refer to a dash-dot line in FIG. 7).

In the scene illustrated in FIG. 11, an acceleration section is set to be longer than that in the scene illustrated in FIG. 10. Thus, the behavior change determination section 33 determines that the target acceleration TG in the front-back direction (e.g., 0.1 G) is equal to or smaller than the acceleration threshold THG2 and larger than the acceleration threshold THG1 with respect to the short-term travel plan that accelerates the own vehicle A within the long acceleration section. Accordingly, in the entire period (t1 to t4) during which the own vehicle A is accelerated, the details of the control by the automatic merging function section 83 are reflected in the control status image 50, and the movement of the control status image 50 synchronizes with or follows a behavior change of the own vehicle A.

Description will be made in order on a time-series basis with reference to FIGS. 11 and 9. At the timing (t1) when the automatic merging function section 83 starts the acceleration control on the basis of the travel plan, the control status image 50 starts moving the tip of the arrow image portion 52 upward. Then, in a period (t1 to t3) before the traveling speed of the own vehicle A reaches the target arrival speed, the arrow image portion 52 is gradually extended in the vertical direction in accordance with an increase in the traveling speed of the own vehicle A. As a result, at the timing (t4) when the acceleration based on the travel plan is completed, the arrow image portion 52 extends up to the length that reflects the traveling speed of the own vehicle A.

In addition, in this period (t1 to t3), the frequency or volume of the sound reproduced by the audio speaker 15 is gradually increased. Further, the footrest control mechanism 110 gradually tilts the footrest 113 forward from the reference position.

In the scenes illustrated in FIGS. 10 and 11, whether to perform the advance presentation is determined on the basis of the target acceleration TG. Alternatively, whether to perform the advance presentation may be determined on the basis of the target speed change amount TS. Specifically, when the behavior change determination section 33 determines that the target speed change amount TS is larger than the speed difference threshold THS2, the advance presentation is performed. On the other hand, when it is determined that the target speed change amount TS is equal to or smaller than the speed difference threshold THS2 and larger than the speed difference threshold THS1, the progress of the GUI is made to coincide with the progress of the vehicle control.

Each of the function sections 81 to 83 is capable of temporarily suspending lane change control and acceleration/deceleration control due to the condition of another vehicle traveling around the own vehicle and override by the driver. When the step (progress) of the vehicle control is brought into a suspended state, the step of the GUI is also brought into a suspended state along with the vehicle behavior. At this time, the GUI by the HUD device 14 is temporarily switched from the control status image 50 to a message image that notifies the suspended state of the control. In addition, the audio speaker 15 reproduces a message voice that notifies the suspended state of the control.

When the progress of the vehicle control is restarted by a release of the suspension, the information presentation of the GUI is returned to the control status image 50 displayed immediately before the switching from the message image and synchronizes with the behavior of the own vehicle A again. In addition, the audio speaker 15 reproduces a message voice that notifies the release of the suspension.

Further, when the vehicle control is suspended during the advance presentation, the GUI is switched from the control status image 50 in the advance presentation to a message image. Then, when the progress of the vehicle control is restarted, the GUI is returned to the control status image 50 displayed immediately before the switching in the advance presentation.

When the suspension of the vehicle control is released, the GUI can also temporarily suspend the advance presentation under execution and restart information presentation with the control status image 50 in synchronization with the behavior of the own vehicle A. The step of the GUI restarted in synchronization with the vehicle control is returned to a state preceding to the step of the vehicle control.

Figure 12:
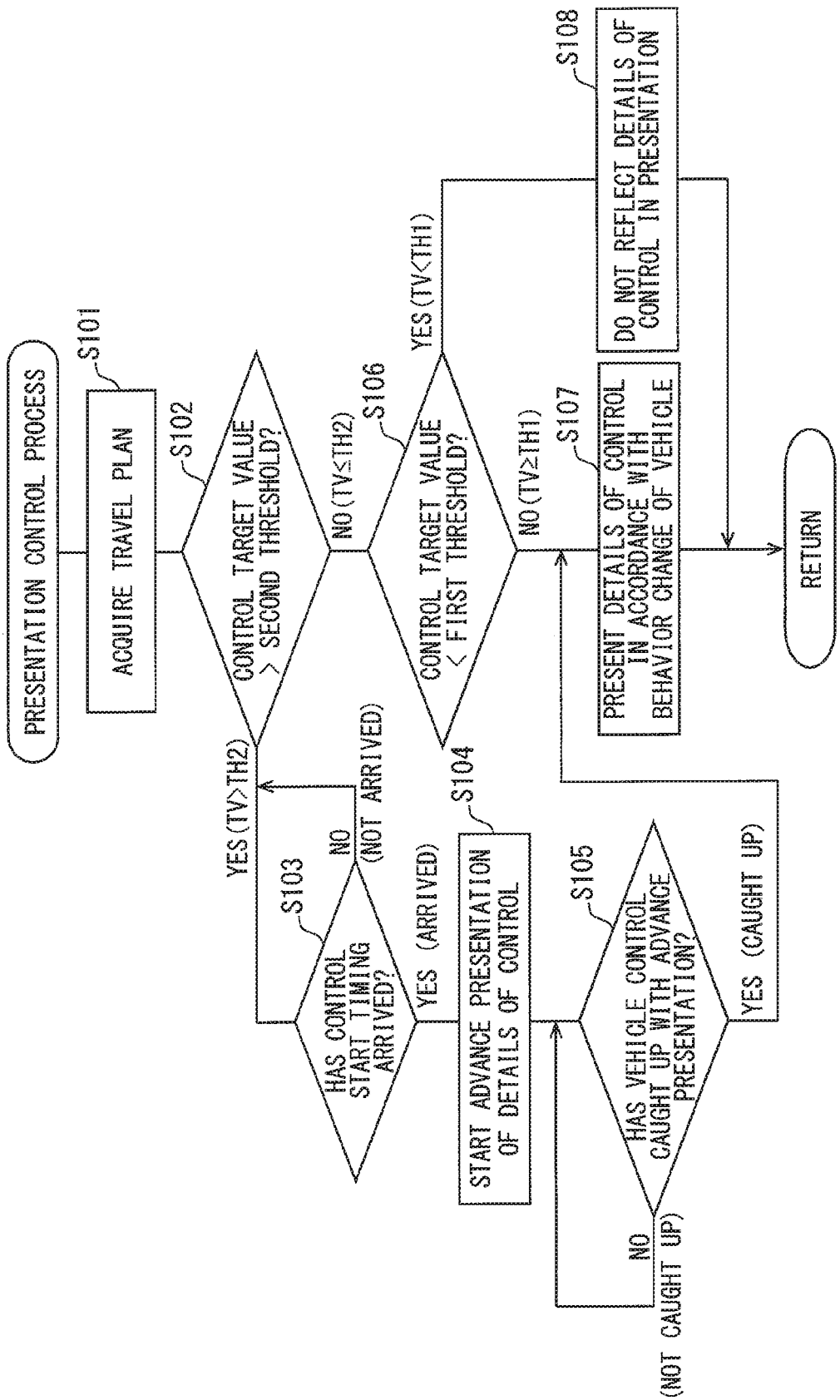
FIG. 12 is a flowchart illustrating a presentation control process performed by the control circuit of the HCU.

The details of a presentation control process for implementing each information presentation described above will be described with reference to FIG. 12, and further to FIGS. 1 and 2. The presentation control process illustrated in FIG. 12 is performed by the control circuit 20a upon actuation of any of the function sections 81 to 83 in the vehicle control ECU 70. The presentation control process is repeatedly performed by the control circuit 20a until all the function sections 81 to 83 are stopped.

The travel plan acquisition section 31 acquires a travel plan generated by the travel plan setting section 84 in S101, and the process proceeds to S102. In S102, the behavior change determination section 33 determines whether each control target value TV (TG, TS, TM) included in the travel plan acquired in S101 is larger than the corresponding second threshold TH2 (THG2, THS2, THM2). When it is determined that the control target value TV is larger than the second threshold TH2 in S102, the process proceeds to S103.

In S103, it is repeatedly determined whether a start timing of control based on the travel plan (refer to t1 in FIGS. 6 and 10) has arrived to wait for the start of the control by each of the function sections 81 to 83. Then, the process proceeds to S104 in response to the start of the control of the own vehicle A.

The presentation of the details of the control by the HUD device 14, the audio speaker 15, and the footrest control mechanism 110 is performed temporarily in advance of an actual behavior change of the own vehicle A in S104, and the process proceeds to S105. In S105, it is determined whether the progress of the control of the own vehicle A has reached the progress of the advance presentation in S104. In S105, the determination is repeatedly performed to wait for the progress of the vehicle control. Then, the process proceeds to S107 when the actual vehicle control has caught up with the advance presentation.

On the other hand, when it is determined that the control target value TV is equal to or smaller than the second threshold TH2 in S102, the process proceeds to S106. In S106, the behavior change determination section 33 determines whether each control target value TV (TG, TS, TM) included in the travel plan acquired in S101 is smaller than the corresponding first threshold TH1 (THG1, THS1, THM1). When it is determined that the control target value TV is equal to or larger than the first threshold TH1 in S106, the process proceeds to S107.

In S107, the details of the control performed by each of the function sections 81 to 83 are presented in accordance with the actual behavior change on the basis of the travel plan acquired in S101 and control information successively acquired in the control information acquisition section 34. Then, the presentation control process is once finished.

On the other hand, when it is determined that the control target value TV is smaller than the first threshold TH1 in S106, the process proceeds to S108. In S108, the details of the control performed by each of the function sections 81 to 83 are not reflected in each presentation. Then, the presentation control process is once finished.

According to the first embodiment described above, when a large behavior change occurs in the own vehicle A, the presentation of the details of control performed by each of the function sections 81 to 82 to the driver is performed temporarily in advance of the actual behavior change of the own vehicle A. As a result, the driver or the like can recognize in advance the occurrence of the large behavior change by the information presentation through the information presentation device 40.

In addition, the information presentation of the GUI exhibits a large change with a short time by the process of temporarily advancing the presentation of a behavior change. Thus, it is possible to notify the driver of the details of control by each of the function sections 81 to 83 in an exaggerated manner. Thus, the driver can easily image the magnitude of the behavior change that is scheduled to occur in the own vehicle A from the information presentation.

According to the above, the driver who has information presented by the information presentation device 40 can accurately predict in advance a large behavior change that is going to occur in the own vehicle A. Thus, the HCU 20 can reduce the anxiety of the driver or the like in the own vehicle A whose behavior is controlled by each of the function sections 81 to 83.

In addition, in the first embodiment, the presentation of the details of control becomes synchronous with an actual vehicle behavior from a point in time slightly before a series of behavior changes based on the travel plan ends (refer to t3 in FIG. 7). Thus, the driver can grasp as quickly as possible that the series of behavior changes ends shortly on the basis of the synchronization of the presentation contents of the GUI with the vehicle behavior.

In the first embodiment, the advance presentation is started from a point in time when acceleration/deceleration control or steering control based on the travel plan is started (refer to t1 in FIG. 7). Thus, the driver can easily grasp the start timing of the vehicle behavior control on the basis of a conspicuous change of the information presentation device 40.

The behavior change determination section 33 of the first embodiment is capable of appropriately determining a large behavior change that makes the driver anxious on the basis of an acceleration in the front-back direction and a movement amount in the lateral direction that are scheduled to be generated in the own vehicle A. Thus, the HCU 20 is capable of reliably performing advance presentation of the details of control in a scene in which the driver is likely to be anxious to reduce the anxiety of the driver.

In addition, the behavior change determination section 33 of the first embodiment is capable of adjusting the second threshold TH2 according to the driving characteristic of the driver. Such individual adaptation enables the HCU 20 to reliably perform advance presentation of the details of control in a scene in which an individual driver is likely to be anxious to reduce the anxiety of the driver.

In the first embodiment, when the control target value TV is smaller than the first threshold TH1, the HCU 20 does not reflect the details of control scheduled to be performed in each of the function sections 81 to 83 in the information presentation. Thus, a slight behavior change, such as correction of a disturbance, generated by each of the function sections 81 to 83 is not notified to the driver, which avoids a situation in which the driver feels the information presentation according to the behavior change troublesome.

In the first embodiment, a plurality of devices including the HUD device 14, the audio speaker 15, and the footrest control mechanism 110 are used in information presentation. Thus, the driver reliably recognizes the details of control scheduled to be performed in each of the function sections 81 to 83.

In the first embodiment, the HUD device 14 corresponds to the "display device", the audio speaker 15 corresponds to the "sound output device", the footrest 113 corresponds to the "footrest portion", and the HCU 20 corresponds to the "presentation control device". Further, the travel plan acquisition section 31 corresponds to the "plan acquisition section", the operation information acquisition section 32 corresponds to the "operation acquisition section", the control status image 50 corresponds to the "display object", and the vehicle control ECU 70 corresponds to the "vehicle control device". Further, the first threshold TH1 corresponds to the "reflection threshold", and the second threshold TH2 corresponds to the "advance threshold".

In the first embodiment, a driver who operates the own vehicle A during manual driving is referred to as a "driver" also during automatic driving as a matter of convenience. The driver mainly corresponds to the "occupant". The driver during automatic driving may bear a monitoring obligation or may not bear the monitoring obligation.

Second Embodiment

A control status image 250 of a second embodiment illustrated in FIGS. 13 to 16 is a modification of the first embodiment. The control status image 250 includes a flying object image portion 252 as a display element corresponding to the arrow image portion 52 (refer to FIG. 8) of the first embodiment. The flying object image portion 252 is displayed in a slightly floating mode from a virtual road surface on display represented by lane marking image portions 51*a* to 51*c*. The flying object image portion 252 includes a pair of triangular figures which are symmetrically disposed right and left. Hereinbelow, the details of the control status image 250 displayed in each scene will be described in order with reference to FIGS. 1, 3, and 4.

Figure 13:
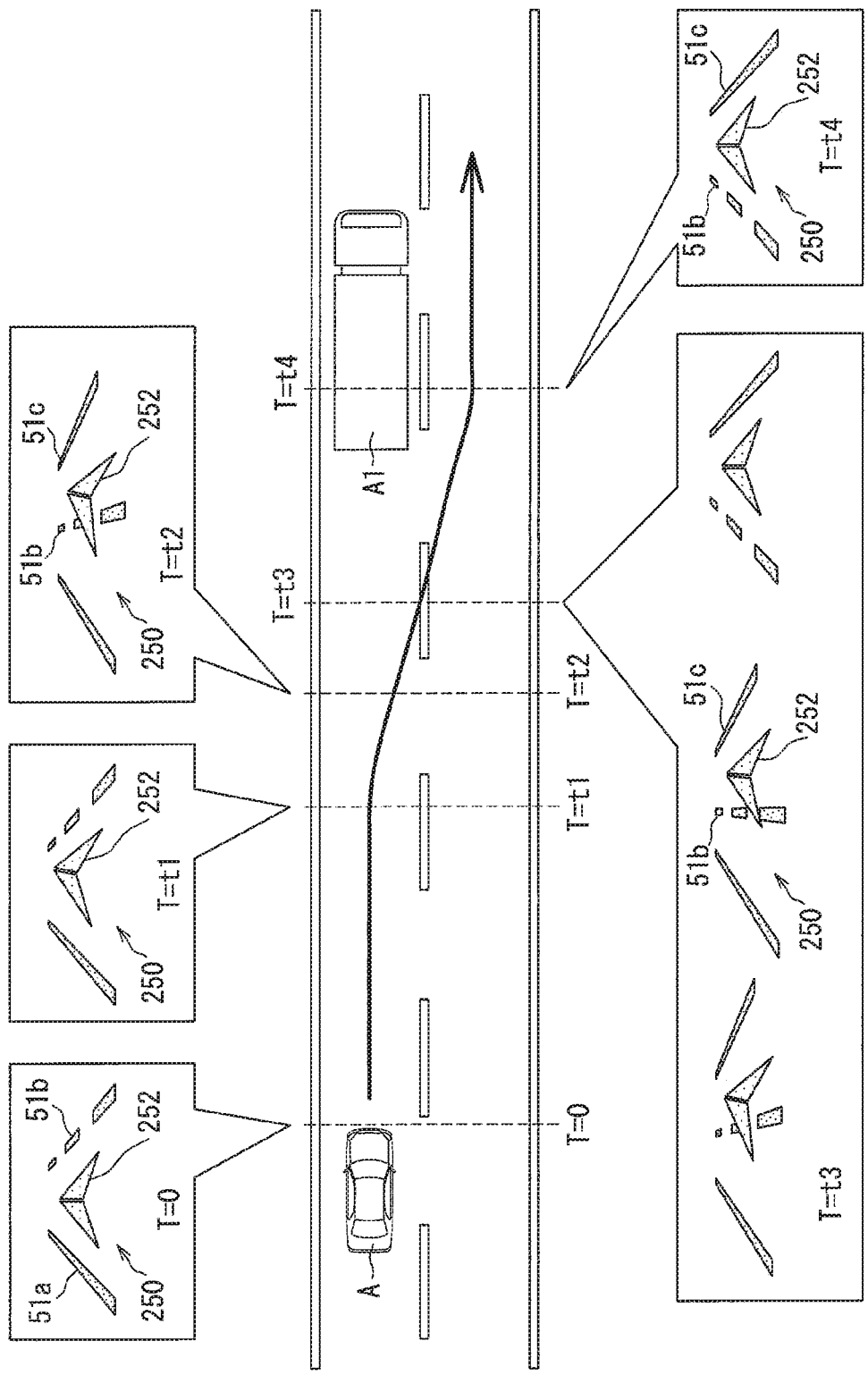
FIG. 13 is a diagram illustrating an example of a scene in which advance presentation is performed in a second embodiment.

FIG. 13 illustrates a scene in which the own vehicle A passes the preceding vehicle A1 similarly to FIG. 6. In the scene, the behavior change determination section 33 determines that the target movement amount TM in the lateral direction is larger than the movement amount threshold THM2. The control status image 250 starts advance presentation of the details of control at the timing (t1) when the LCA function section 82 starts the steering control. Also in the second embodiment, the advance presentation is performed only in a period (t1 to t3) before the own vehicle A crosses the right lane marking.

The control status image 250 rotates the flying object image portion 252 in a clockwise direction to move the tip of the flying object image portion 252 to the right side at the timing (t1) when the steering control is started. Then, the control status image 250 causes the flying object image portion 25 to cross the right lane marking image portion 51*b* at the timing (t2) that is earlier than the own vehicle A actually crosses the right lane marking. As a result, the flying object image portion 252 is brought in to a mode in which the tip thereof is located between the two lane marking image portions 51*b*, 51*c* which define a passing lane on the display to notify the driver in advance of a destination of the own vehicle A.

The control status image 250 maintains the mode of the flying object image portion 252 which crosses the lane marking image portion 51*b* until the timing (t3) when the own vehicle A actually crosses the lane marking. Then, when a step in which the own vehicle A actually crosses over the lane marking has arrived, the control status image 250 further moves the position of the flying object image portion 252 to the right side in accordance with the movement of the own vehicle A in the lateral direction. As a result, at the timing (t4) when the lane change based on the travel plan is completed, the flying object image portion 252 is displayed on the center between the two lane marking image portions 51*b*, 51*c*. In addition, the flying object image portion 252 is returned to an attitude with the tip facing up so as to reflect the behavior of the own vehicle A traveling straight ahead.

Figure 14:
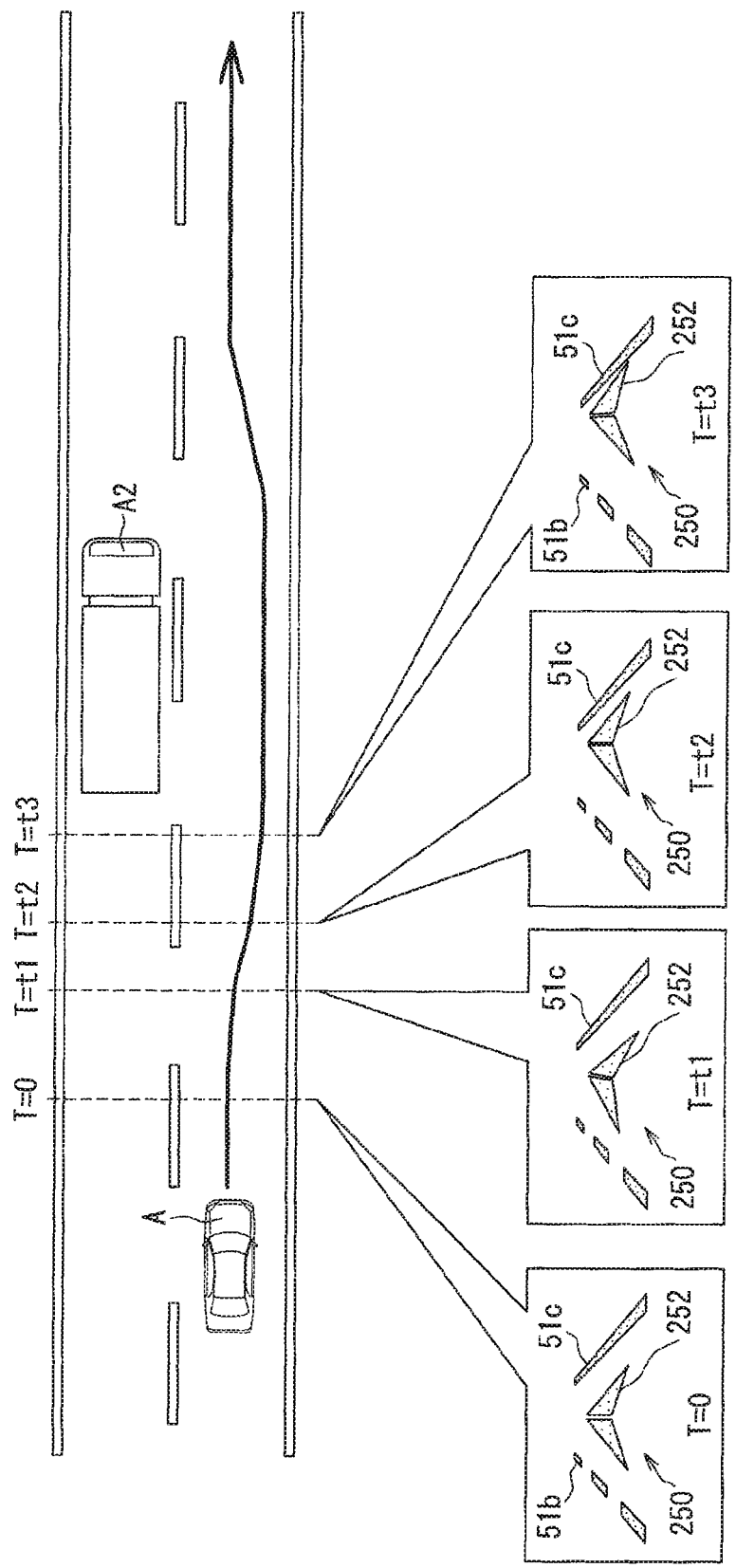
FIG. 14 is a diagram illustrating an example of a scene in which no advance presentation is performed in the second embodiment.

FIG. 14 illustrates a scene in which the own vehicle A passes the large-size vehicle A2 traveling on an adjacent lane similarly to FIG. 8. In the scene, the behavior change determination section 33 determines that the target movement amount TM in the lateral direction is equal to or smaller than the movement amount threshold THM2 and larger than the movement amount threshold THM1. In the entire period (t1 to t4) during which offset of the own vehicle A is performed, the control status image 252 reflects the details of control by the LTC function section 81, and causes the movement of the flying object image portion 252 to synchronize with or follow a behavior change of the own vehicle A.

At the timing (t1) when the LTC function section 81 starts the steering control for the offset on the basis of the travel plan, the control status image 250 rotates the flying object image portion 252 in the clockwise direction to slightly move the tip of the flying object image portion 252 in the lateral direction (rightward). As a result, in a period (t1 to t2) during which the own vehicle A approaches the right lane marking, the flying object image portion 252 has a form in which the tip thereof is close to the right lane marking image portion 51*c*.

Then, when the own vehicle A has been moved close to the right lane marking, and the offset has been completed (t3), the flying object image portion 252 rotates in a counterclockwise direction so as to return to an attitude with the tip facing up. At this time, the flying object image portion 252 is located at a position closer to the right lane marking image portion 51*c* than to the left lane marking image portion 51*b*.

Figure 15:
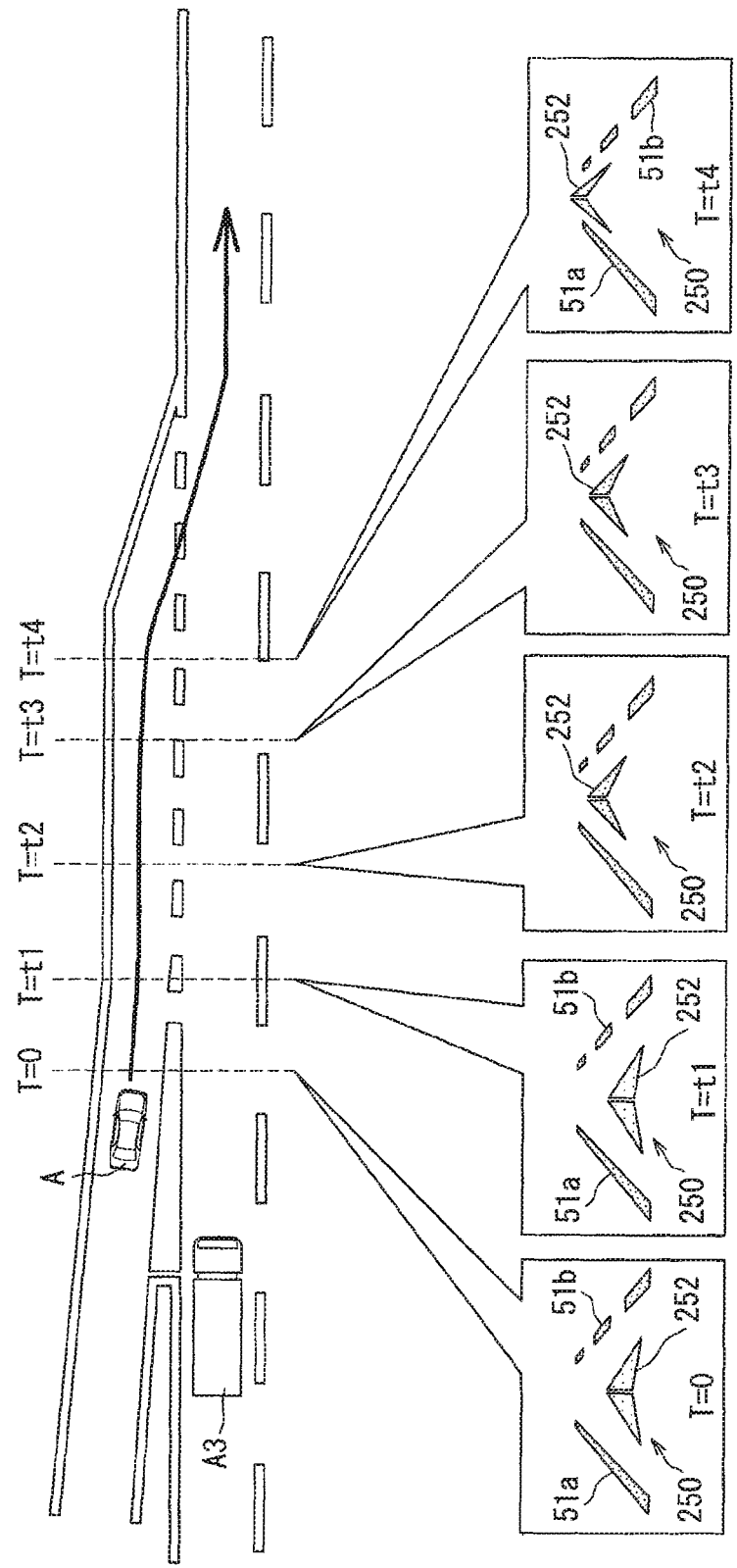
FIG. 15 is a diagram illustrating another example of the scene in which the advance presentation is performed.

FIG. 15 illustrates a scene in which the own vehicle A is caused to merge into a main through lane similarly to FIG. 10. In the scene, the behavior change determination section 33 determines that the target acceleration TG in the front-back direction is larger than the acceleration threshold THG2. The control status image 250 starts advance presentation of the details of control at the timing (t1) when the automatic merging function section 83 starts the acceleration control. Also in the second embodiment, the advance presentation is performed only in a period (t1 to t3) before the traveling speed of the own vehicle A exceeds a target intermediate speed.

In the merging scene illustrated in FIG. 15, the control status image 250 indicates the traveling speed of the own vehicle A by the relative position in the up-down direction of the flying object image portion 252 with respect to each of the lane marking image portions 51*a*, 51*b*. Thus, the control status image portion 250 starts moving the flying object image portion 252 upward at the timing (t1) when acceleration control is started. As a result, the flying object image portion 252 completes the movement to the position corresponding to the target intermediate speed at the timing (t2) that is earlier than the traveling speed of the own vehicle A reaches the target intermediate speed. With such a conspicuous movement of the flying object image portion 252, the control status image 250 notifies the driver in advance of strong acceleration scheduled in the own vehicle A.

The control status image 250 maintains the displayed position of the flying object image portion 252 until the timing (t3) when the traveling speed of the own vehicle A reaches the target intermediate speed. Then, when a step in which the traveling speed of the own vehicle A exceeds the target intermediate speed has arrived, the control status image 250 further moves the position of the flying object image portion 252 upward in accordance with the acceleration of the own vehicle A. As a result, at the timing (t4) when the acceleration based on the travel plan is completed, the flying object image portion 252 is displayed at the position that reflects the current traveling speed of the own vehicle A which has reached the target arrival speed.

FIG. 16 illustrates a scene in which the own vehicle A is caused to merge into a main through lane similarly to FIG. 11. In the scene, the behavior change determination section 33 determines that the target acceleration TG in the front-back direction is equal to or smaller than the acceleration threshold THG2 and larger than the acceleration threshold THG1. In the entire period (t1 to t4) during which the own vehicle A is accelerated, the control status image 250 reflects the details of control by the automatic merging function section 83, and causes the movement of the flying object image portion 252 to synchronize with or follow a behavior change of the own vehicle A.

At the timing (t1) when acceleration control is started on the basis of the travel plan, the control status image 250 starts moving the flying object image portion 252 upward. Then, in a period (t1 to t3) before the traveling speed of the own vehicle A reaches the target arrival speed, the control status image 250 gradually moves the displayed position of the flying object image portion 252 upward in accordance with an increase in the traveling speed of the own vehicle A. As a result, at the timing (t4) when the acceleration based on the travel plan is completed, the flying object image portion 252 is displayed at the position that reflects the current traveling speed of the own vehicle A which has reached the target arrival speed.

The control status image 250 of the second embodiment as described above can also achieve effects similar to the effects of the first embodiment. Thus, the driver can accurately predict in advance a large behavior change that is going to occur in the own vehicle A. Therefore, even when each of the function sections 81 to 83 controls the behavior of the own vehicle A, it is possible to reduce the anxiety of the driver or the like. In the second embodiment, the control status image 250 corresponds to the "display object".

OTHER EMBODIMENTS

The advance presentation by each of the above embodiments is temporarily performed until the middle of a series of vehicle controls based on one travel plan. In this manner, the end timing of the advance presentation (refer to t3 in FIG. 6) may be appropriately set. Further, the advance presentation may be performed throughout the entire period of a series of vehicle controls based on one travel plan.

The advance presentation by each of the above embodiments is started simultaneously with the start timing (refer to t1 in FIG. 6) of a specific vehicle control by each of the function sections 81 to 83. However, the start timing of the advance presentation may be earlier than the start timing of the vehicle control. Such presentation enables the driver to recognize the occurrence of a large behavior change at an earlier stage. Further, the start timing of the advance presentation may be later than the start timing of the vehicle control. Such presentation results in a more conspicuous mode change of the information presentation. Thus, the driver can reliably recognize the occurrence of a large behavior change.

In the above embodiments, the acceleration in the front-back direction, the speed difference to the target traveling speed, and the movement amount in the lateral direction are used as values for evaluating the magnitude of a behavior change. However, the behavior change determination section can determine the magnitude of a behavior change using another value. For example, the behavior change determination section may evaluate the magnitude of a scheduled behavior change on the basis of the acceleration in the lateral direction or the degree of a jerk in the front-back direction. Further, the behavior change determination section may be configured to evaluate the magnitude of a behavior change using not an individual threshold, but a determination device constructed by machine learning.

In the above embodiments, the acceleration threshold THG2 as the second threshold TH2 is set in such a manner that, for example, advance presentation is performed with an acceleration of approximately 0.2 G. Further, the movement amount threshold THM2 as the second threshold TH2 is set in such a manner that advance presentation is performed with a lateral movement across a lane marking. However, each threshold can be appropriately changed. Further, the absolute value of the acceleration threshold THG2 when deceleration control is performed may differ from the absolute value of the acceleration threshold THG2 when deceleration control is performed.

In the above embodiments, the individual adaptation of the second threshold TH2 is performed by monitoring a driving operation during manual driving. However, such individual adaptation may be omitted. Further, for example, the second threshold may be adjusted in accordance with a preference of the driver by an input to a steering switch 16a (refer to FIG. 1) by the driver.

In the above embodiments, the first threshold TH1 for the omission of reflection into information presentation of the details of control is set. However, the first threshold TH1 may be omitted. Further, the details of a tiny vehicle control may be eliminated from a travel plan output to the communication bus so as not to be reflected in information presentation.

In the above embodiments, the details of control by each of the function sections is presented to the driver by a combination of virtual display by the HUD device 14, sound presentation by the audio speaker 15, and tactual presentation by the footrest control mechanism 110. However, only one of the virtual display, the sound presentation, and the tactual presentation may be used to present the details of control to the driver.

A configuration that displays the control status image is not limited to the HUD device 14, and may be the combination meter 12 or the CID 13. Further, the configuration that displays the control status image may not be a display device installed in the vehicle. For example, the control status image may be displayed on a screen of a portable terminal carried into the vehicle by the driver.

In the above embodiments, the travel plan setting section 84 of the vehicle control ECU 70 generates a travel plan. However, the travel plan may be generated outside the own vehicle A and transmitted to the vehicle control ECU 70.

In the above embodiments, positional information and traveling speed information of another vehicle are acquired by vehicle-to-vehicle communication and road-to-vehicle communication by the ITS communication device 97. However, the ITS communication device 97 may be eliminated. Information of another vehicle around the own vehicle can be acquired with sufficient accuracy and reliability only by the external recognition system 90.

In the above embodiments, the function sections 81 to 83 are described as functional blocks for automatic driving which are constructed in the vehicle control ECU 70. However, the functional blocks constructed in the vehicle control ECU are not limited to these function sections. For example, an adaptive cruise control (ACC) function section and a lane keeping assist (LKA) function section may be constructed in the vehicle control ECU. Further, these function sections may be actuated in response to an input to the steering switch 16a (refer to FIG. 1) by the driver or an entry of the own vehicle A into a specific automatic driving section.

In the above embodiments, the functions provided by the main processor 21 and the drawing processor 22 of the HCU 20 can also be provided by hardware and software different from the above, or the combination of hardware and software. For example, in an in-vehicle network in which the HCU 20 is eliminated, the control circuit of the vehicle control ECU, a control circuit of the combination meter, and a control circuit of the CID may partially or entirely execute the presentation control process. Further, each function may be provided by hardware and software different from the above, or the combination of hardware and software. Further, various nontransitive and substantive storage media such as a flash memory and a hard disk can be employed as a memory that stores a program executed by each of the processors 21, 22.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A presentation control device that controls an information presentation device to present information to an occupant of a vehicle equipped with a vehicle control device for controlling at least one of an acceleration and deceleration function and a steering function, the presentation control device comprising:
a plan acquisition section that acquires, using a processor, a travel plan indicating a content of control of the vehicle scheduled in the vehicle control device;
a behavior change determination section that determines, using the processor, whether a control target value relating to a magnitude of a behavior change included in the travel plan is larger than an advance threshold corresponding to the control target value; and
a presentation execution section that
presents, using the processor, the content of control performed by the vehicle control device to the occupant using the information presentation device in accordance with the behavior change which is caused in the vehicle by the vehicle control device in response to the control target value being smaller than the advance threshold, and
presents, using the processor, the content of control to be performed by the vehicle control device based on the travel plan temporarily in advance of an actual behavior change which is caused in the vehicle by the vehicle control device in response to the control target value being larger than the advance threshold.

2. The presentation control device according to claim 1, wherein:
the presentation execution section presents the content of control in advance of the actual behavior change until a middle portion of the travel plan acquired by the plan acquisition section, and presents the content of the control in accordance with the actual behavior change in an end portion of the travel plan.

3. The presentation control device according to claim 1, wherein:
the presentation execution section starts advance presentation of the content of control with respect to the actual behavior change in response to starting to control the acceleration and deceleration function or the steering function based on the travel plan.

4. The presentation control device according to claim 1, wherein:
the presentation execution section presents the content of control in advance of the actual behavior change in response to a target acceleration in a front-back direction set as the control target value being larger than an acceleration threshold set as the advance threshold.

5. The presentation control device according to claim 1, wherein:
the presentation execution section presents the content of control in advance of the actual behavior change in response to a target speed change amount set as the control target value being larger than a speed difference threshold set as the advance threshold.

6. The presentation control device according to claim 1, wherein:
the presentation execution section presents the content of control in advance of the actual behavior change in response to a target movement amount in a lateral direction set as the control target value being larger than a movement amount threshold set as the advance threshold.

7. The presentation control device according to claim 1, further comprising:
an operation acquisition section that acquires a transition of a driving operation input by the occupant in a state where the occupant performs the driving operation of the vehicle, wherein:
the behavior change determination section adjusts the advance threshold according to a characteristic of the driving operation of the occupant acquired by the operation acquisition section.

8. The presentation control device according to claim 1, wherein:
the behavior change determination section determines whether the control target value is larger than a reflection threshold that is smaller than the advance threshold; and
the presentation execution section does not reflect the content of control of the vehicle control device on a presentation of the information presentation device in response to the control target value being smaller than the reflection threshold.

9. The presentation control device according to claim 1, wherein:
the presentation execution section does not reflect the content of control, which is performed by the vehicle control device for adjusting the behavior change of the vehicle caused by a disturbance, on a presentation of the information presentation device.

10. The presentation control device according to claim 1, wherein:
the information presentation device includes a display device that presents the information to the occupant with a display object; and
the presentation execution section presents the content of control of the vehicle control device to the occupant by changing a display mode of the display object based on the travel plan.

11. The presentation control device according to claim 1, wherein:
the information presentation device includes a sound output device that presents the information to the occupant with a sound; and
the presentation execution section presents the content of control of the vehicle control device to the occupant by changing at least one of a frequency and a sound volume of the sound output from the sound output device based on the travel plan.

12. The presentation control device according to claim 1, wherein:
the information presentation device includes a footrest control mechanism that presents the information to the occupant with a movement of a footrest portion where a foot of the occupant is placed; and
the presentation execution section presents the content of control of the vehicle control device to the occupant by changing a position of the footrest portion based on the travel plan.

13. A presentation control method for controlling an information presentation device to present information to an occupant of a vehicle equipped with a vehicle control device of controlling at least one of an acceleration and deceleration function and a steering function, the presentation control method comprising:
acquiring a travel plan indicating a content of control of the vehicle scheduled in the vehicle control device;
determining whether a control target value relating to a magnitude of a behavior change included in the travel plan is larger than an advance threshold corresponding to the control target value;
presenting the content of control performed by the vehicle control device to the occupant using the information presentation device in accordance with the behavior change which is caused in the vehicle by the vehicle control device in response to the control target value being smaller than the advance threshold; and
presenting the content of control to be performed by the vehicle control device based on the travel plan temporarily in advance of an actual behavior change which is caused in the vehicle by the vehicle control device in response to the control target value being larger than the advance threshold.

14. A presentation control device that controls an information presentation device to present information to an occupant of a vehicle equipped with a vehicle control device for controlling at least one of an acceleration and deceleration function and a steering function, the presentation control device comprising:
a plan acquisition section that acquires, using a processor, a travel plan indicating a content of control of the vehicle scheduled in the vehicle control device;
a behavior change determination section that determines, using the processor, whether a control target value relating to a magnitude of a behavior change included in the travel plan is larger than an advance threshold corresponding to the control target value;
a presentation execution section that presents, using the processor, the content of control performed by the vehicle control device to the occupant using the information presentation device in accordance with the behavior change occurring in the vehicle in response to the control target value being smaller than the advance threshold, and presents, using the processor, the content of control to be performed by the vehicle control device based on the travel plan temporarily in advance of an actual behavior change in response to the control target value being larger than the advance threshold; and
an operation acquisition section that acquires, using the processor, a transition of a driving operation input by the occupant in a state where the occupant performs the driving operation of the vehicle, wherein:
the behavior change determination section adjusts, using the processor, the advance threshold according to a characteristic of the driving operation of the occupant acquired by the operation acquisition section.

15. A presentation control device that controls an information presentation device to present information to an occupant of a vehicle equipped with a vehicle control device for controlling at least one of an acceleration and deceleration function and a steering function, the presentation control device comprising:
a plan acquisition section that acquires, using a processor, a travel plan indicating a content of control of the vehicle scheduled in the vehicle control device;
a behavior change determination section that determines, using the processor, whether a control target value relating to a magnitude of a behavior change included in the travel plan is larger than an advance threshold corresponding to the control target value; and
a presentation execution section that presents, using the processor, the content of control performed by the vehicle control device to the occupant using the information presentation device in accordance with the behavior change occurring in the vehicle in response to the control target value being smaller than the advance threshold, and presents, using the processor, the content of control to be performed by the vehicle control device based on the travel plan temporarily in advance of an actual behavior change in response to the control target value being larger than the advance threshold,
the behavior change determination section determines, using the processor, whether the control target value is larger than a reflection threshold that is smaller than the advance threshold; and
the presentation execution section does not reflect the content of control of the vehicle control device on a presentation of the information presentation device in response to the control target value being smaller than the reflection threshold.

16. The presentation control device according to claim 1, wherein the processor comprises multiple processors including a main processor and a drawing processor.

17. The presentation control device according to claim 14, wherein the processor comprises multiple processors including a main processor and a drawing processor.

18. The presentation control device according to claim 15, wherein the processor comprises multiple processors including a main processor and a drawing processor.

* * * * *